(12) United States Patent
Inazawa et al.

(10) Patent No.: US 6,587,948 B1
(45) Date of Patent: Jul. 1, 2003

(54) RECORDING APPARATUS, RECORDING MEDIUM, PLAYBACK APPARATUS, RECORDING METHOD AND PLAYBACK METHOD

(75) Inventors: Yoshizumi Inazawa, Kanagawa (JP); Tadashi Fukami, Kanagawa (JP); Keisuke Yamaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/245,746

(22) Filed: Feb. 8, 1999

(30) Foreign Application Priority Data

Feb. 13, 1998 (JP) ............................. 10-030939

(51) Int. Cl.[7] ............................ H04L 9/10; G06F 12/14; G11B 7/24
(52) U.S. Cl. ..................... 713/193; 713/190; 380/26; 380/27; 380/46; 380/54; 380/201; 380/203; 705/57; 369/275.3; 369/59.24; 369/53.21
(58) Field of Search ................................. 713/190, 193; 705/57; 380/26, 27, 28, 31, 32, 42, 43, 44, 45, 46, 54, 201, 203; 369/47.12, 47.13, 47.19, 47.35, 53.21, 59.24, 94, 95, 116, 119, 120, 275.3

(56) References Cited

U.S. PATENT DOCUMENTS 5,995,623 A * 11/1999 Kawano et al. ............. 380/277
6,157,606 A * 12/2000 Inazawa et al. ............. 369/116
6,289,102 B1 * 9/2001 Ueda et al. .................. 380/201

FOREIGN PATENT DOCUMENTS

| EP | 0545472 | 6/1993 | ........... G11B/20/00 |
| EP | 0635828 | 1/1995 | ........... G11B/20/00 |
| EP | 0637023 | 2/1995 | ........... G11B/20/00 |
| EP | 0723216 | 7/1996 | ............. G06F/1/00 |
| EP | 0751517 | 1/1997 | ........... G11B/20/00 |
| EP | 0866454 | 9/1998 | ........... G11B/20/00 |
| EP | 10269577 | 10/1998 | ............. G11B/7/00 |
| EP | 10320779 | 12/1998 | ............. G11B/7/00 |

* cited by examiner

*Primary Examiner*—Gilberto Barrón
*Assistant Examiner*—Justin T. Darrow
(74) *Attorney, Agent, or Firm*—Jay H. Maioli

(57) ABSTRACT

A recording method and a recording apparatus whereby digital data is recorded onto a disc as run-length limited code used for modulating marks or spaces on the disc and, at the same time, the recorded digital data is encrypted by using key data which is also recorded onto the same disc by varying the shape of marks or spaces with timing having no effect on the edges of the marks or the spaces. A playback method and a playback apparatus reproduces the digital data and the key data recorded on the disc by the recording method and/or the recording apparatus from the disc with the key data used for decrypting the reproduced digital data.

6 Claims, 17 Drawing Sheets

| PIV | IV | | | | | | |
|-----|-------|----|-------|----|-------|----|-------|
| 0h | 0001h | 1h | 4000h | 2h | 2000h | 3h | 1000h |
| 4h | 0800h | 5h | 0400h | 6h | 0200h | 7h | 0100h |
| 8h | 4080h | 9h | 2040h | Ah | 1020h | Bh | 0810h |
| Ch | 0480h | Dh | 0204h | Eh | 0102h | Fh | 4081h |

  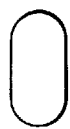 
   
   
   
   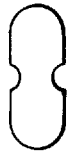
F I G. 19A     F I G. 19B     F I G. 19C     F I G. 19D ns with timing having no effect on the edges of the marks or the spaces. In addition, the present invention also relates to a playback method and a playback apparatus for reproducing the digital data and the key data recorded on the disc by the recording method and/or the recording apparatus from the disc with the key data used for decrypting the encrypted digital data.
RECORDING APPARATUS, RECORDING MEDIUM, PLAYBACK APPARATUS, RECORDING METHOD AND PLAYBACK METHOD

BACKGROUND OF THE INVENTION

The present invention relates to a recording method and a recording apparatus whereby digital data is recorded onto a disc as run-length limited code by modulating digital data used for modulating marks or spaces on the disc and, at the same time, the recorded digital data is encrypted by using key data which is also recorded onto the same disc by variation of the shape of marks or spaces with timing having no effect on the edges of the marks or the spaces. In addition, the present invention also relates to a playback method and a playback apparatus for reproducing the digital data and the key data recorded on the disc by the recording method and/or the recording apparatus from the disc with the key data used for decrypting the encrypted digital data.

In the commonly known related art compact disc, after completing data processing, audio data is subjected to EFM (Eight-to-Fourteen Modulation) to form a series of pits with a period in the range of 3T to 11T where the symbol T is a predetermined basic period. In this way, audio data or other information is recorded in the compact disc.

The compact disc player for playing back a signal from this compact disc radiates a laser beam to the disc and receives a light reflected by the compact disc. The compact disc player then obtains a playback signal having a level varying with the quantity of the received light and compares the playback signal with a predetermined slice level in order to convert the playback signal into a binary signal in a binary conversion process. A PLL circuit is driven to extract a playback clock signal from the binary signal. The extracted playback clock signal is in turn used for sequentially latching the binary signal to generate playback data with a period varying in the range of 3T to 11T corresponding to a series of pits formed on the compact disk.

The compact disc player then decodes the playback data generated in the way described above by carrying out data processing as a counterpart of the data processing performed in the recording operation. As a result, audio data or other information recorded on the compact disc is played back.

In order to effectively avoid an illegal copy in a transfer system for transferring audio data through such an optical-information recording medium, there have been proposed copy preventing systems like those shown in FIGS. 1 or 2.

An encoder 3 employed in a disc producing apparatus 2 in the copy preventing system 1 shown in FIG. 1 carries out scramble processing on data D1 to be recorded on an optical disc 5 by using a master key KM and then records the data completing the scramble processing on the optical disc 5. On the other hand, a decoder 7 employed in a playback apparatus 6 carries out descramble processing on playback data reproduced from the optical disc 5 typically by using the shared master key as the disc producing apparatus 2. Then, a decoder 8 complying with MPEG (Moving Picture Expert Group) specifications processes data obtained as a result of the descramble processing. Thus, in the copy preventing system 1, the encoder 3 scrambles the data D1 by using the predetermined master key KM shared with the playback apparatus 6 in order to prevent an illegal copy.

In the copy preventing system 10 shown in FIG. 2, on the other hand, data D1 is scrambled by using a master key KM, a disc key DK unique to an optical disc 11 and a title key KT unique to a work recorded on the optical disc 11. To put it in detail, an encoder 13 employed in a disc producing apparatus 12 carries out scramble processing on the disc key DK by using the master key KM and records the disc key DK completing the scramble processing on the optical disc 11. Then, an encoder 14 employed in the disc producing apparatus 12 carries out scramble processing on the title key KT by using the disc key DK completing the scramble processing and records the title key KT completing the scramble processing on the. optical disc 11.

Subsequently, an encoder 15 employed in the disc producing apparatus 12 carries out scramble processing on the data D1 to be recorded by using the title key KT completing the scramble processing and records the data D1 completing the scramble processing on the optical disc 11. The disc producing apparatus 12 carries out multiple scramble processing on the data D1 with the master key KM used as a reference and records the data D1 completing the multiple scramble processing on the optical disc 11.

A decoder 17 employed in a playback apparatus 16 carries out descramble processing on the disc key DK completing the scramble processing by using the master key KM to decode the disc key DK. A decoder 18 employed in a playback apparatus 16 then carries out descramble processing on the title key KT completing the scramble processing, by using the disc key DK to decode the title key KT. Subsequently, a decoder 19 employed in a playback apparatus 16 carries out descramble processing on the data D1 completing the scramble processing by using the disk key DK.

The copy preventing system 10 adds the functional positions of the disc producer and the author of the work to the scramble and descramble processes, avoiding an illegal copy.

By the way, there are two types of illegal copy. An illegal copy of the first type is produced by using a result of decoding a master key. As a result, an illegal user is capable of reproducing a signal from the illegal copy by using a playback apparatus even if the illegal copy is produced as a result of piracy. An illegal copy of the second type is produced by physically copying a pit form created on a legal optical disc.

In a copy preventing system based on a master key, the problem of an illegal copy of the first type can be solved by making it difficult to decode the master key. This solution has a shortcoming, however, that once the master key has been decoded, it is no longer possible to avoid piracy of discs whatsoever. In addition, this solution is not applicable to piracy to produce an illegal copy of the second type.

SUMMARY OF THE INVENTION

It is thus an object of the present invention addressing the problems described above to provide a recording apparatus, a recording medium, a playback apparatus, a recording method and a playback method which are capable of effectively preventing illegal copies.

According to an aspect of the present invention, there is provided a recording apparatus for successively recording digital data as alternating marks and spaces on a disc by modulation of said marks or said spaces in a run-length direction thereof in accordance with said data, said recording apparatus comprising: a key data generating means for generating key data; an encryption means for encrypting said digital data on the basis of said key data generated by said key data generating means; a key data modulation means for modulating said marks or said spaces in a width direction thereof in accordance with said key data generated by said key data generating means; and a recording means for recording said key data used in modulation of said marks or said spaces carried out by said key data modulation means in a width direction thereof and digital data encrypted by said encryption means.

According to another aspect of the present invention, there is provided a disc-shaped recording medium for storing digital information encrypted by using predetermined key data on recording tracks by modulation of a series of alternating marks and spaces on each of said recording tracks, said disc-shape recording medium comprising: a program area having a plurality of said recording tracks wherein said encrypted digital information is recorded by modulation of said marks or said spaces in a run-length direction thereof; and a lead-in area for recording said key data by modulation of said marks or said spaces in a width direction thereof.

According to still another aspect of the present invention, there is provided a playback apparatus for reproducing key data and digital data encrypted by using said key data from a disc-shaped recording medium wherein: said digital data is recorded by modulation of marks or spaces in a run-length direction thereof in a program area of said disc-shaped recording medium; and said key data for decrypting digital data is recorded by modulation of marks or spaces in a width direction thereof in a lead-in area of said disc-shaped recording medium, said playback apparatus comprising: a playback means for reproducing information from said lead-in area; a demodulation means for demodulating said information reproduced by said playback means from said lead-in area on the basis of variations in mark or space in width direction to decrypt said key data; and a decryption means for decrypting said digital main data recorded in said program area by using said key data resulting from demodulation of said information by said demodulation means.

According to a further aspect of the present invention, there is provided a recording method for recording digital main data as alternating marks and spaces on a disc by modulation of said marks or said spaces in a run-length direction thereof in accordance with said data, said recording method comprising the steps of: generating key data; encrypting said digital main data on the basis of said key data; and recording said key data by modulation of said marks or said spaces in a width direction thereof in accordance with said key data and recording digital data encrypted on the basis of said key data by modulation of said marks or said spaces in a run-length direction thereof in accordance with said digital main data.

According to a still further aspect of the present invention, there is provided a playback method for reproducing key data and digital main data encrypted by using said key data from a disc-shaped recording medium wherein: said digital main data is recorded by modulation of marks or spaces in a run-length direction thereof in a program area of said disc-shaped recording medium; and said key data is recorded by modulation of marks or spaces in a width direction thereof in a lead-in area of said disc-shaped recording medium, said playback method comprising the steps of: reproducing information from said lead-in area; demodulating said information reproduced from said lead-in area on the basis of variations in mark or space in a width direction to produce said key data; and decrypting said digital main data recorded in said program area by using said key data resulting from demodulation of said information.

BRIEF DESCRIPTION OF THE DRAWINGS

FIG. 19A is a diagram showing shapes of pits created on a disc provided by a first embodiment;

FIG. 19B is a diagram showing shapes of pits created on a disc provided by a second embodiment;

FIG. 19C is a diagram showing shapes of pits created on a disc provided by a third embodiment; and FIG. 19D is a diagram showing shapes of pits created on a disc provided by a fourth embodiment.

DESCRIPTION OF THE PREFERRED EMBODIMENTS

The present invention will become more apparent from the following detailed description of some preferred embodiments of the present invention with reference to accompanying diagrams.

Figure 1:
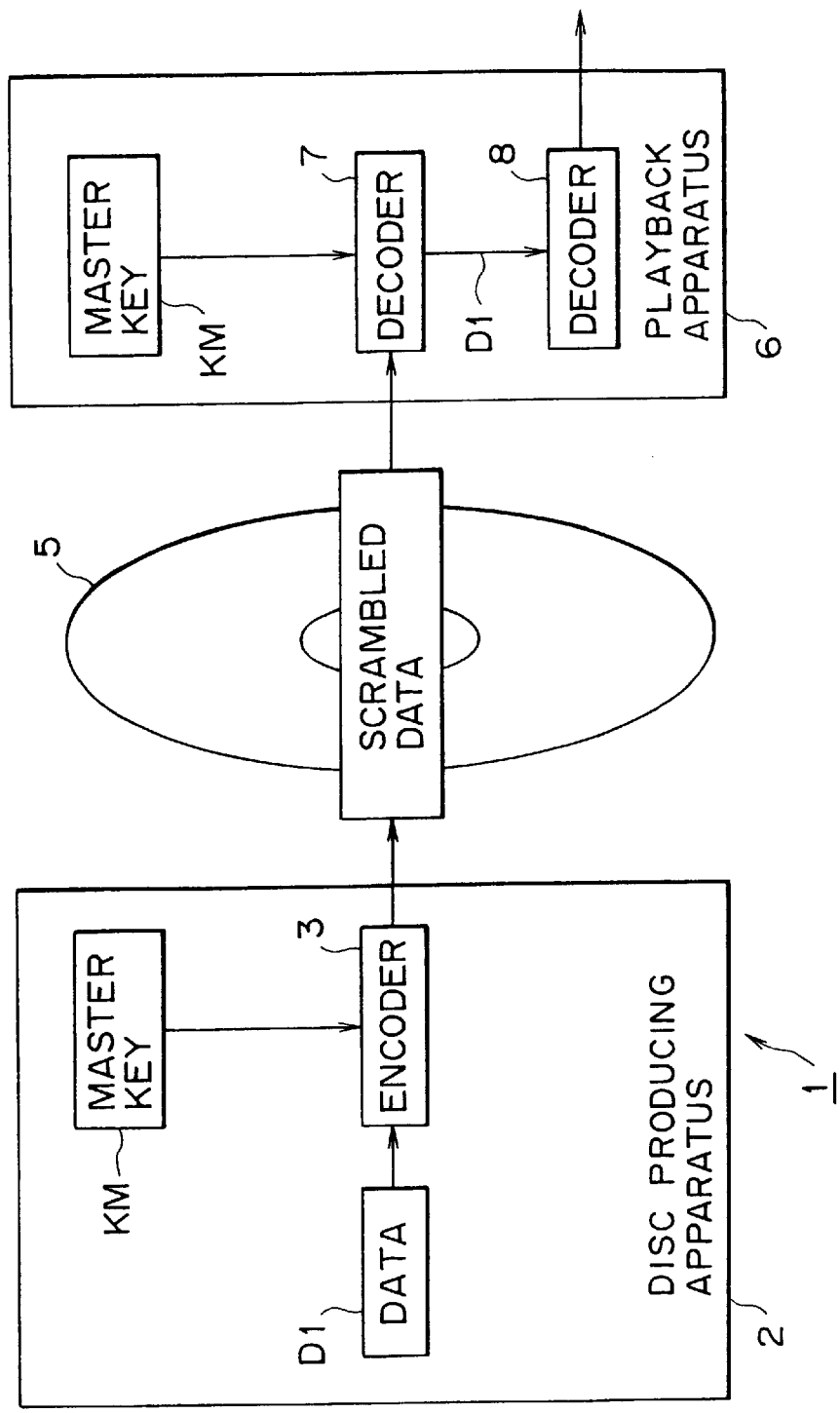
FIG. 1 is an overall block diagram showing an example of the related art copy preventing system.
Figure 2:
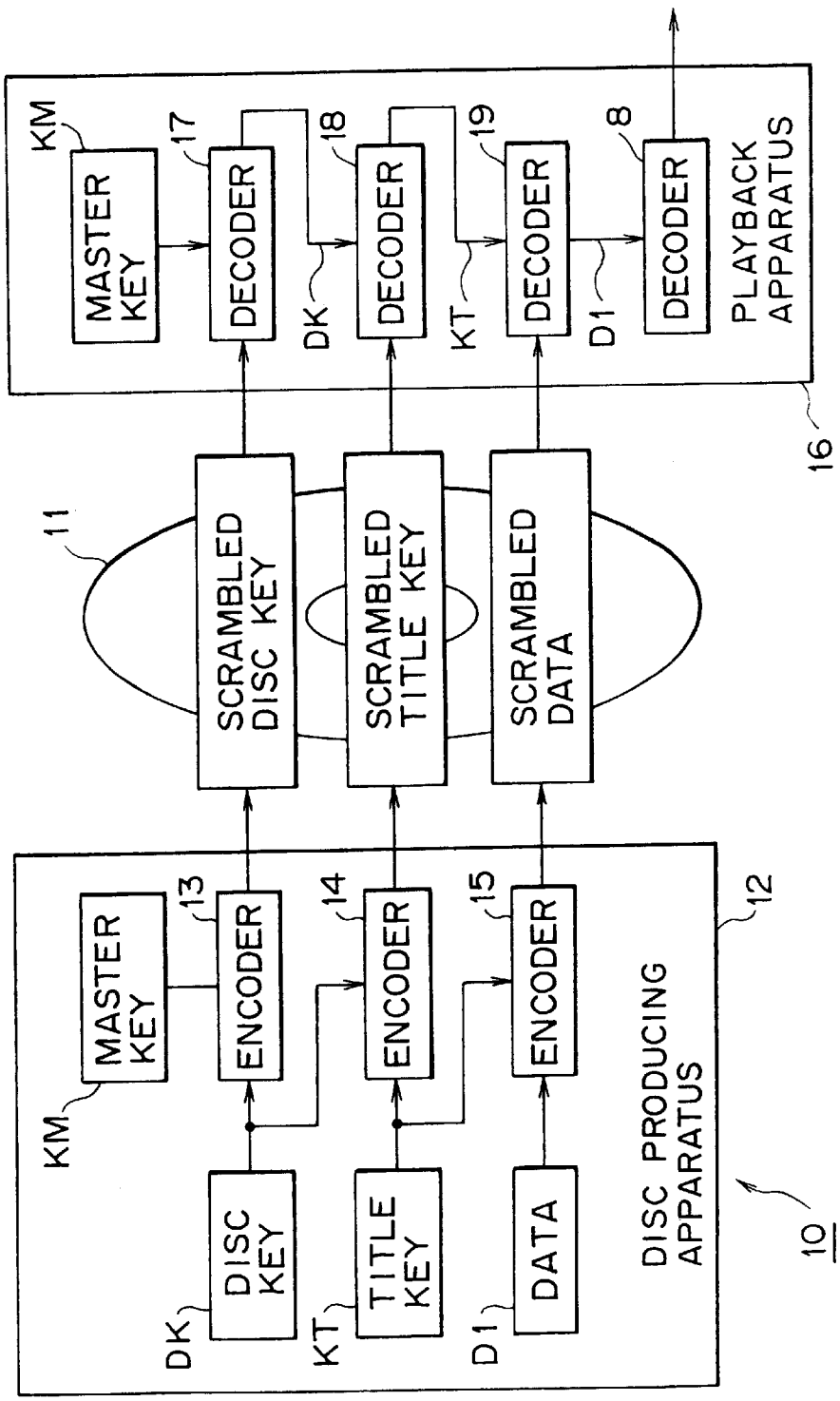
FIG. 2 is an overall block diagram showing another example of the related art copy preventing system.
Figure 3:
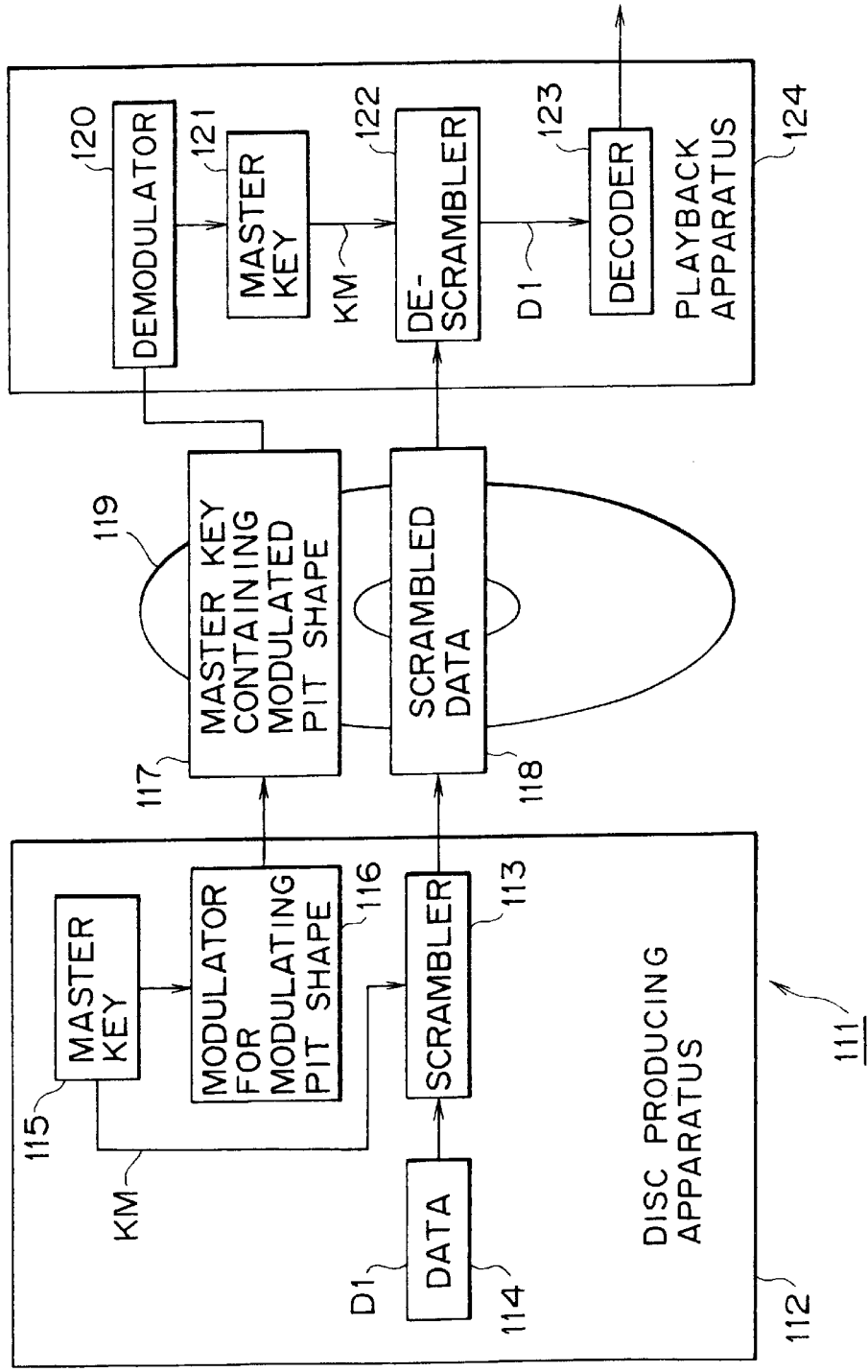
FIG. 3 is an overall block diagram showing a first copy preventing system provided by the present invention.

FIG. 3 is an overall block diagram showing information transfer paths of a copy preventing system 111 implemented by a first embodiment of the present invention. As shown in the figure, the copy preventing system 111 comprises a disc producing apparatus 112, an optical disc 119 and a playback apparatus 124. In the disc producing apparatus 112, a digital audio data D1 to be recorded is generated by a data generator 114 which generates original data already recorded typically in a medium such as a master tape. The digital audio data D1 generated by the data generator 114 is scrambled (encrypted) by a scrambler (encryption-means) 113 using a master key KM generated by a master key generator 115 and recorded into a program area of the optical disc 119. On the other hand, the master key KM generated by the master-key generator 115 is modulated by a modulator 116 and recorded into a lead-in area of the optical disc 119. To put it concretely, the modulator 116 selects a pit with a length of at least a predetermined value or greater among a series of pits created on the optical disc 119 and records the master key KM onto the optical disc 119 with a variation in width of the selected pit in such a way that it is difficult to decode the master key KM in a playback operation.

A technique of modulation in the pit-width (pit-transversal) direction, as shown in FIG. 15B and FIGS. 19A–19D and produced by the circuit FIG. 10, will be described in more detail later in connection with the second embodiment of the present invention.

In the playback apparatus 124, the modulated master key KM recorded in the lead-in area of the optical disc 119 is reproduced. The modulated master key KM reproduced from the lead-in area of the optical disk 119 is then demodulated by a demodulator 120 to restore it as an original master key KM. Scrambled data reproduced from the program area of the optical disc 119 is descrambled (decrypted) by a descrambler (decryptor) 122 on the basis of the master key KM obtained as a result of the demodulation carried out by the demodulator 120. The result of the descrambling (decryption) is the original data D1 which is then subjected to predetermined decode processing carried out by a decoder 123.

Figure 4:
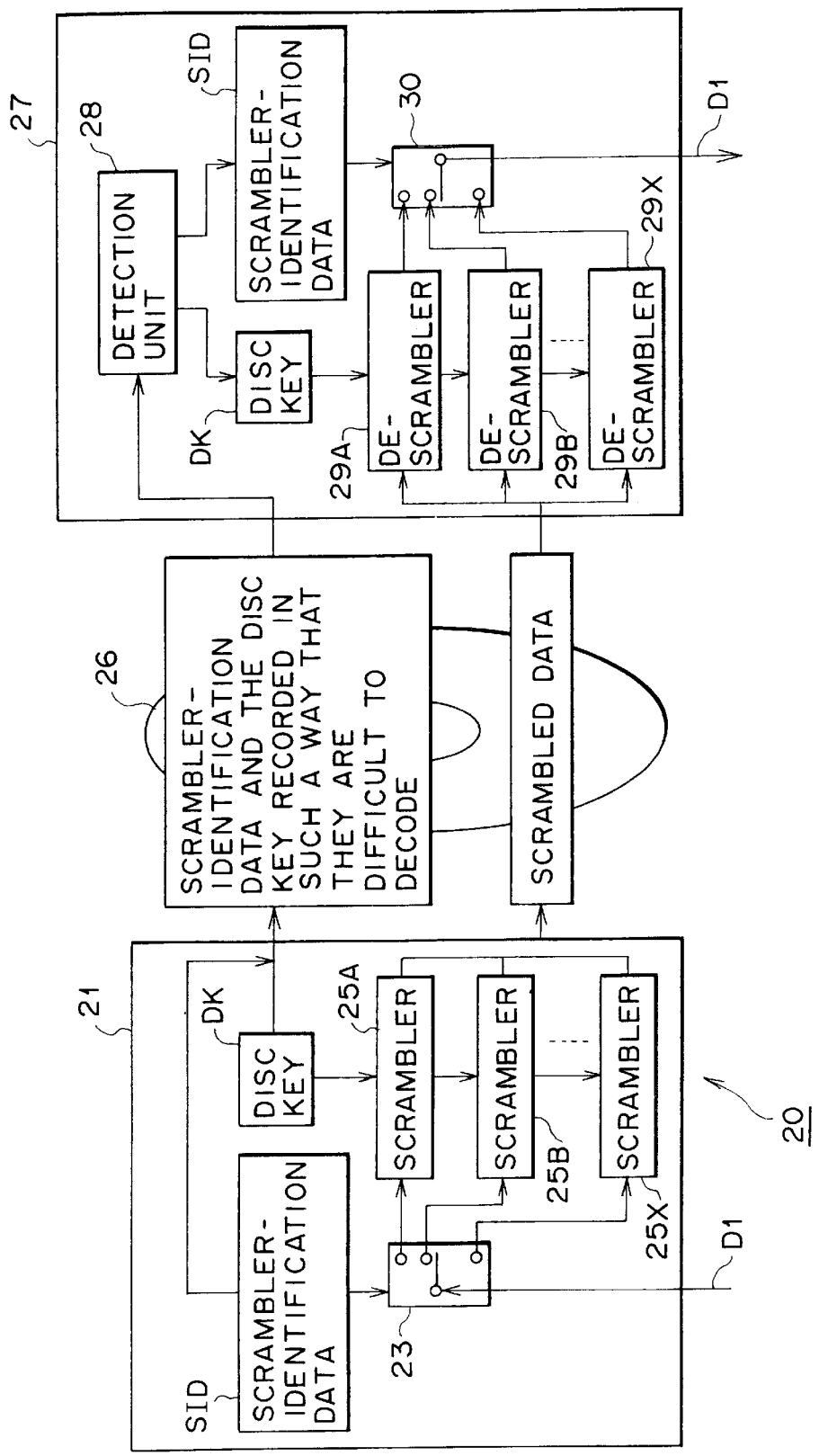
FIG. 4 is an overall block diagram showing a second copy preventing system provided by the present invention.

FIG. 4 is an overall block diagram showing information transfer paths 20 of a copy preventing system implemented by a second embodiment of the present invention. The second embodiment is different from the first embodiment in that, in the case of the former, there are provided a plurality of scramblers (encryption-means) having scrambling (encryption) techniques different from each other; scrambler-identification data (encryption-means-identification data) is used for specifying a specific scrambler among the plurality of scramblers; the specific scrambler selected by using the scrambler-identification data scrambles (encrypts) data to be recorded into the program area of an optical disc 26 by using a disc key DK; and the disc key DK and the scrambler-identification data are subjected to predetermined modulation before being recorded into the lead-in area of the optical disc 26.

In the information transfer paths 20, a disc producing apparatus 21 supplies the digital audio signal D1 to a select circuit 23 for passing on the digital audio signal D1 to one of scramblers 25A to 25X selected by scrambler-identification data SID. The scramblers 25A to 25X are set to carry out scrambling processes in different ways based on the common disc key DK to generate a scrambled digital audio signal D1.

The scrambler-identification data SID is an identification data used for selecting one of the scramblers 25A to 25X which carry out scrambling processes in ways different from each-other. That is to say, the scrambler-identification data SID is data for identifying the way to carry out a scrambling process. The disc key DK is composed of data on which the scrambling is based. The scrambler-identification data SID, the disc key DK and an initial pointers PIVs to be described later are generated at random typically for each optical disc 26 in accordance with a predetermined select reference by a disc producer and a disc manufacturer. A disc producing apparatus 21 carries out scramble processing (encryption) on the digital audio signal D1 by using a scrambler selected among the scramblers 25A to 25X as described above and records data output by the selected scrambler onto the optical disc 26.

The disc producing apparatus 21 also records the scrambler-identification data SID and the disc key DK onto the optical disc 26 in such a way to be described later that they are difficult to decode. In an operation to record the digital audio data D1 on the optical disc 26, the disc producing apparatus 21 forms a series of pits sequentially by varying the pit length and the pit gap in accordance with data output by the scramblers 25A to 25X. The pit length and the pit gap each comprise units which are made each equal to a predetermined reference period. Thus, the pit length or the pit gap are varied by changing the number of units composing the length and the gap respectively, and digital audio signal D1 is recorded onto optical disk 26. The disc producing apparatus 21 selects pits longer than a predetermined length from the series of pits formed in this way and changes the widths of the selected pits with timing not having an effect whatsoever on information on positions of edges of pits detected during a playback operation. As a result, it is difficult to decode the scrambler-identification data SID and the disc key DK recorded on the optical disc 26.

In a playback apparatus 27, on the other hand, a detection unit 28 detects the level of a playback signal for demodulating the scrambler-identification data SID and the disc key DK. Then, the disc key DK is used for descrambling playback data by a plurality of descramblers 29A to 29X corresponding respectively to the scramblers 25A to 25X employed in the disc producing apparatus 21. The scrambler identification data SID is used for driving a select circuit 30 to select a descrambling result output by one of the descramblers 29A to 29X specified by the scrambler-identification data SID as reproduced data resulting from an operation to play back the digital a audio signal D1 recorded on the optical disc 26.

Figure 5:
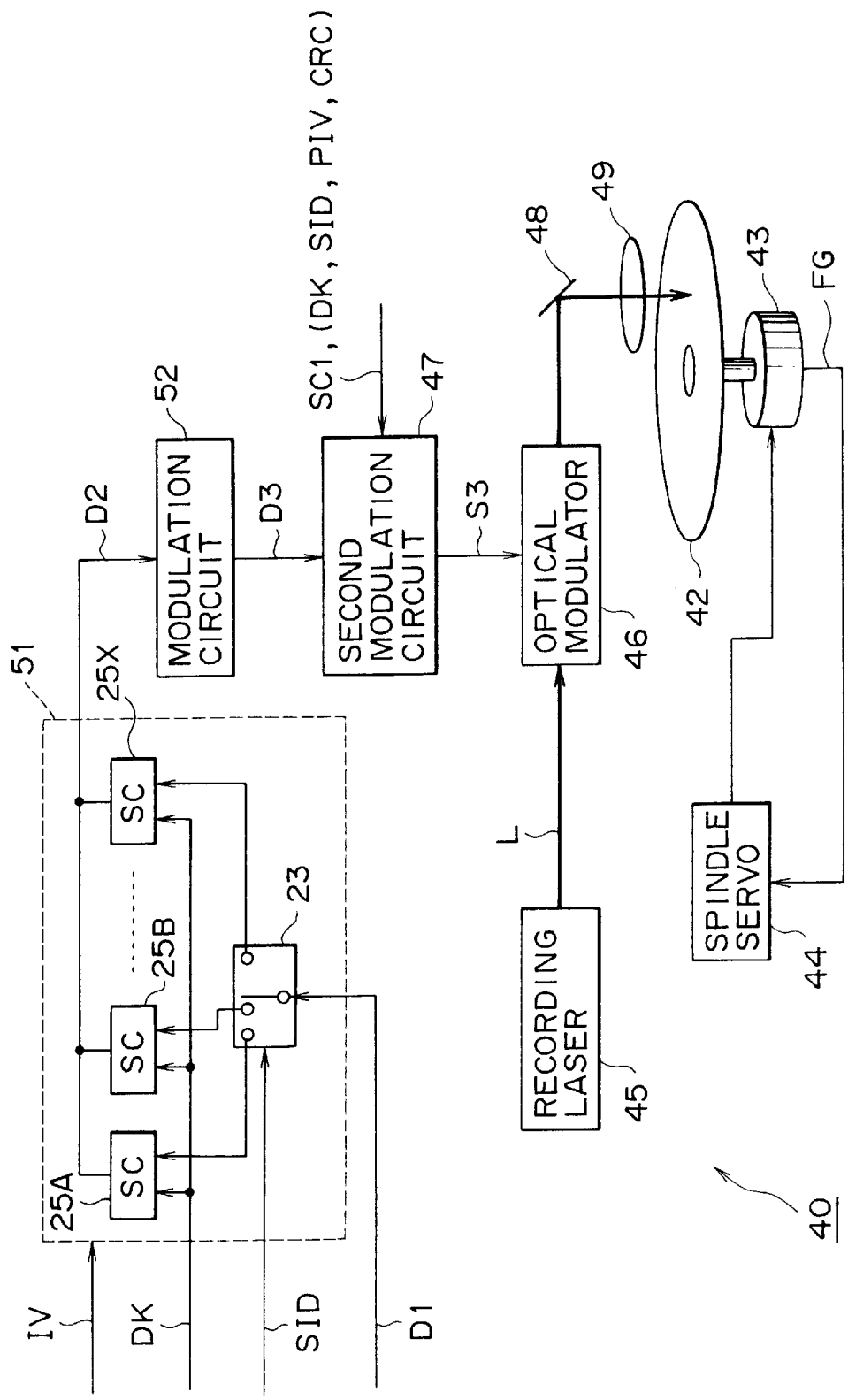
FIG. 5 is an overall block diagram showing a disc recording apparatus provided by the present invention.

FIG. 5 is a block diagram showing an optical-disc recording apparatus 40 used in the manufacturing of the optical disc 26. In the manufacturing process of the optical disc 26 provided by the embodiment, after a disc raw plate 42 completing an exposure process carried out by the optical-disc recording apparatus 40 has been developed, a mother disc is made by an electrocasting process. Then, an information recording surface is formed by using this mother disc.

The disc raw plate 42 is made typically by coating a plane glass substrate with a light-sensitive material. A spindle motor 43 drives the disc raw plate 42 into rotation under control executed by a spindle-servo circuit 44. At that time, an FG-signal generator installed at the bottom of the spindle motor 43 outputs an FG signal denoted by notation FG which has a level rising for each predetermined rotation angle. The spindle-servo circuit 44 drives the spindle motor 43 so that the frequency of the FG signal FG becomes equal to a predetermined frequency. In this way, the disc raw plate 42 is driven into rotation under a condition of a constant linear speed.

Typically implemented by a gas laser, a recording laser 45 radiates a laser beam L having a predetermined quantity of light. Implemented typically by an electro-acoustic optical device, an optical modulator 46 turns on and off the laser beam L radiated by the recording laser 45 in accordance with a modulated signal S3 supplied thereto by a second modulation circuit 47.

A mirror 48 bends the optical path of the laser beam L, radiating the laser beam L to the disc raw plate 42. An objective lens 49 focuses the light reflected by the mirror 48 on the recording surface of the disc raw plate 42. The mirror 48 and the objective lens 49 are sequentially moved in the radial direction synchronously with the rotation of the disc raw plate 42 by a thread mechanism which is not shown in the figure. As a result, in the optical-disc recording apparatus 40, the focus position of the laser beam L is sequentially displaced toward the outermost circumference of the disc raw plate 42, forming a track having a spiral-like shape on the disc raw plate 42. At the same time, a series of pits representing the modulated signal S3 are created along the track.

A scramble circuit 51 comprises the scramblers (SCs) 25A to 25X and the select circuit 23 described earlier by referring to FIG. 4. The scramble circuit 51 scrambles the digital audio signal D1, outputting a scrambled signal D2. The digital audio signal D1 is supplied to the scramble circuit 51 as serial data, that is, a 1-bit digital audio signal obtained as a result of 1-bit quantization after being sampled at a sampling frequency of 2.8224 MHz, a value equal to 64 times as much as a sampling frequency of 44.1 kHz for the ordinary digital audio signal.

Figures 6, 7:
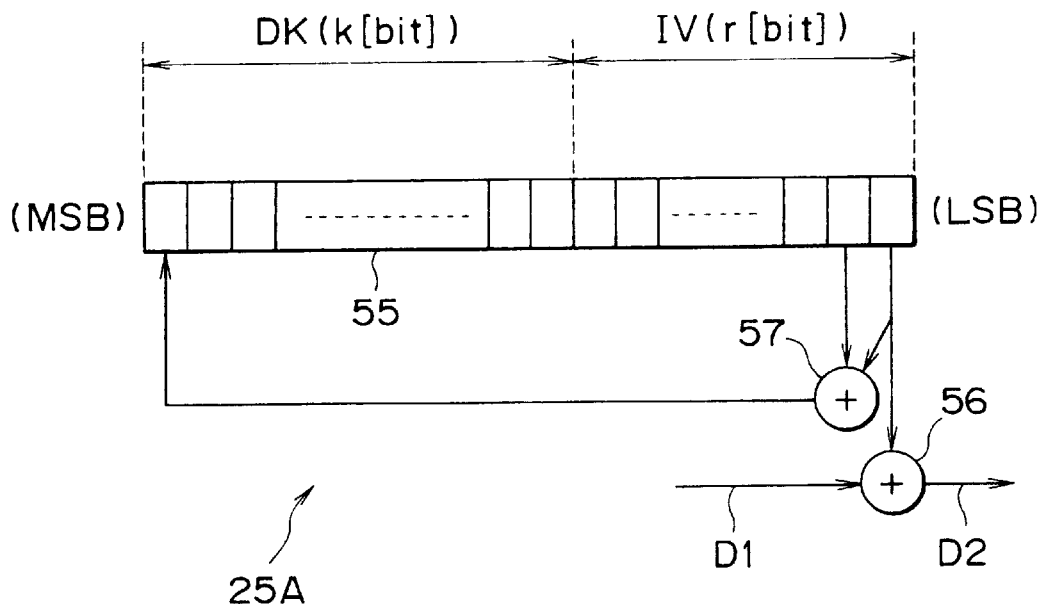
FIG. 6 is a block diagram showing a concrete configuration of a scrambler employed in the disc recording apparatus shown in FIG. 5.
FIG. 7 is a table showing initial values set in a plurality of scramblers shown in FIG. 6.

FIG. 6 is a block diagram showing the configuration of the scrambler 25A. As shown in the figure, the scrambler 25A comprises a shift register 55 and exclusive OR circuits 56 and 57. The shift register 55 comprises a predetermined number of latch circuits connected to each other to form a series circuit consisting of as many stages as the latch circuits. The latch circuits operate with a channel clock signal CK used as a timing reference. The exclusive OR circuit 56 inputs data output by the shift register 55 and the digital audio data D1, outputting exclusive logical sum data D2. The exclusive OR circuit 57 feeds back the exclusive-logical-sum data with regard to the data output by a latch circuit at a predetermined stage of the shift register 55 to the first stage of shift register 55.

The shift register 55 of the scrambler 25A contains the disc key DK from the first to kth stages, and an initial value IV from the following (k+1)th stage to last stage for each sector on the disc raw plate 42 for recording the digital audio signal D1. The disc key DK is k bits in length while the initial value IV is r bits in length where r is 16 in the case of the embodiment.

The configurations of the other scramblers 25B to 25X are the same as the configuration of the scrambler 25A except the stage of the shift register 55 outputting data to the exclusive OR circuit 57 and the initial value IV. As a matter of fact, the stage of the shift register 55 outputting data to the exclusive OR circuit 57 and the initial value IV vary from scrambler to scrambler. By making the stage of the shift register 55 outputting data to the exclusive OR circuit 57 vary from scrambler to scrambler, the way of the scramble processing is carried out also varies from scrambler to scrambler. Thus, the scramblers 25A to 25X scramble the digital audio signal D1 with the disc key DK and the initial value IV taken as a reference in processing ways different from each other, being capable of outputting signals D2 at logic levels different from each other.

Associated with a 1-bit initial pointer PIV, the initial values IVs are each 16-bit numerical data shown in FIG. 7. The initial values IVs are each assigned to one of the scramblers 25A to 25X. Thus, the scramblers 25A to 25X are capable of maintaining randomness among them. In addition, in the case of input digital audio data D1 comprising consecutive logic values of 0, it is possible to output a result D2 of the scramble processing based on random logic levels.

As described above, in the scramble circuit 51, the digital audio signal D1 is subjected to scramble processing in a scrambler selected by the scrambler-identification data SID among the scramblers 25A to 25X which are designed to output results of scramble processing different from each other.

After adding error-correction codes to the data D2 output by the scramble circuit 51 and sub-code data supplied by a sub-code generator not shown in the figure, a modulation circuit 52 caries out interleave processing. Modulation based on a predetermined modulation technique is further carried out on the data D2 to generate modulated data D3 having repetitive signal-level raising and falling edges in the range of 3T to 11T where a period T is the basic period of the clock signal CK. It should be noted that 3T is a minimum period in which it is possible to suppress inter-code interference in the pit-series direction in a range sufficient for practical purposes in the optical system of the playback apparatus. TOC (Table of Contents) data, that is, data for controlling the digital audio signal D1 supplied from a system control circuit not shown in the figure, is also modulated in the same way to be recorded in a lead-in area of the optical disc 26.

Figure 8:
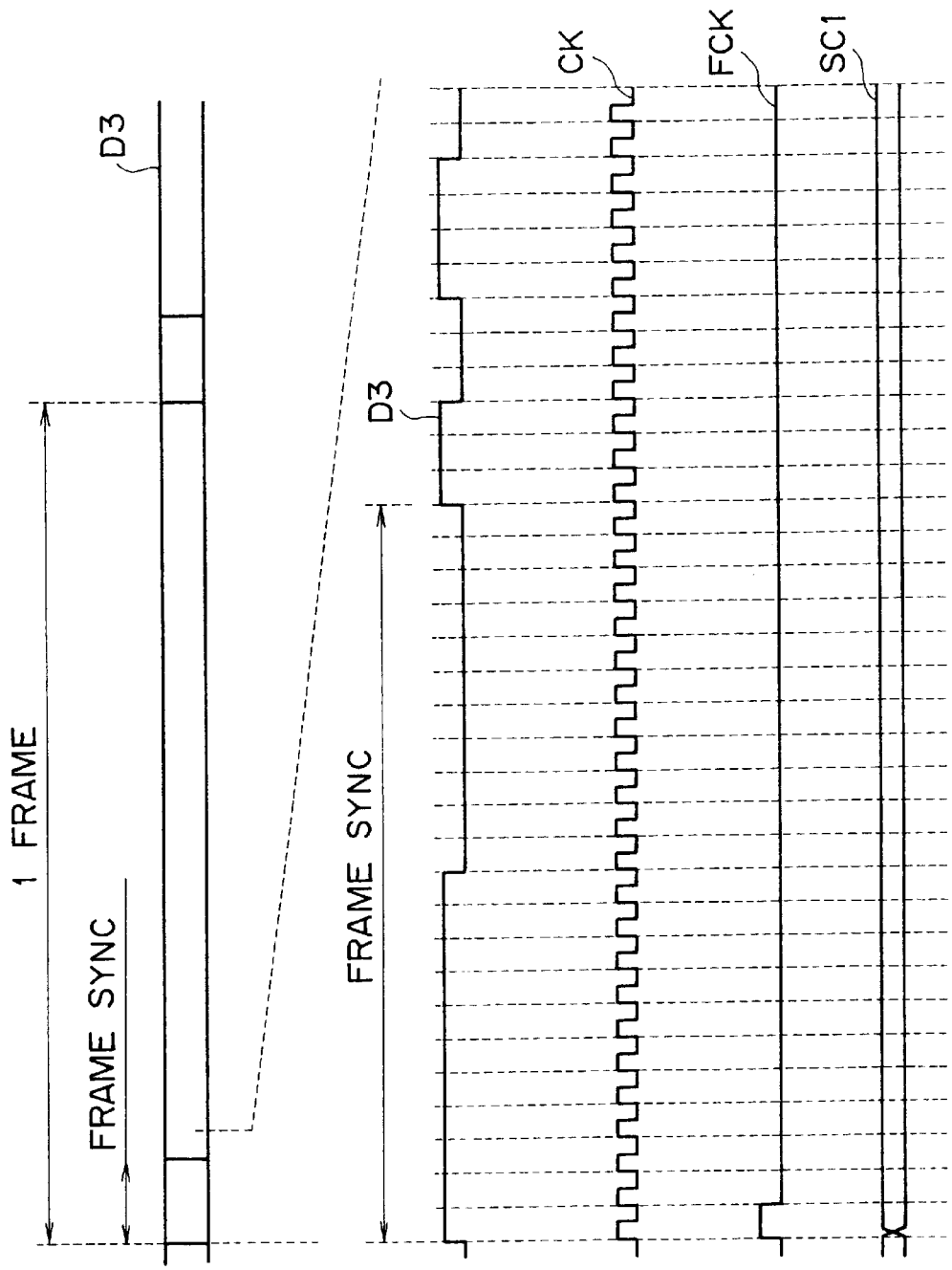
FIG. 8A is a timing chart of modulated data D3.
FIG. 8B is a timing chart of modulated data D3 further extended in the time-axis direction.
FIG. 8C is a timing chart of a channel clock signal CK.
FIG. 8D is a timing chart of a frame clock signal FCK.
FIG. 8E is a timing chart of a control data SC1.

As shown in FIGS. 8A to 8E, the modulation circuit 52 generates modulated data D3 shown in FIGS. 8A and 8B in synchronization with a predetermined channel clock signal CK shown in FIG. 8C. At that time, the modulation circuit 52 inserts frame syncs into the generated modulated data D3 at intervals predetermined with the channel clock signal CK taken as a reference. Thus, the modulated data D3 is configured in a frame configuration with a synchronous frame taken as a unit. The modulation circuit 52 also generates a frame clock signal FCK shown in FIG. 8D raising a signal level by one clock period with timing of the start of the frame sync. A second modulation circuit 47 of the optical-disc recording apparatus 40 to be described later processes control data SC1 of FIG. 8E based on information such as the disc key DK with this frame clock signal FCK used as a timing reference.

The second modulation circuit 47 shown in FIG. 5 modulates the modulated data D3 output by the modulation circuit 52 using the control data SC1 to generate a modulated signal S3 based on the so-called double modulation signals.

Figure 9:
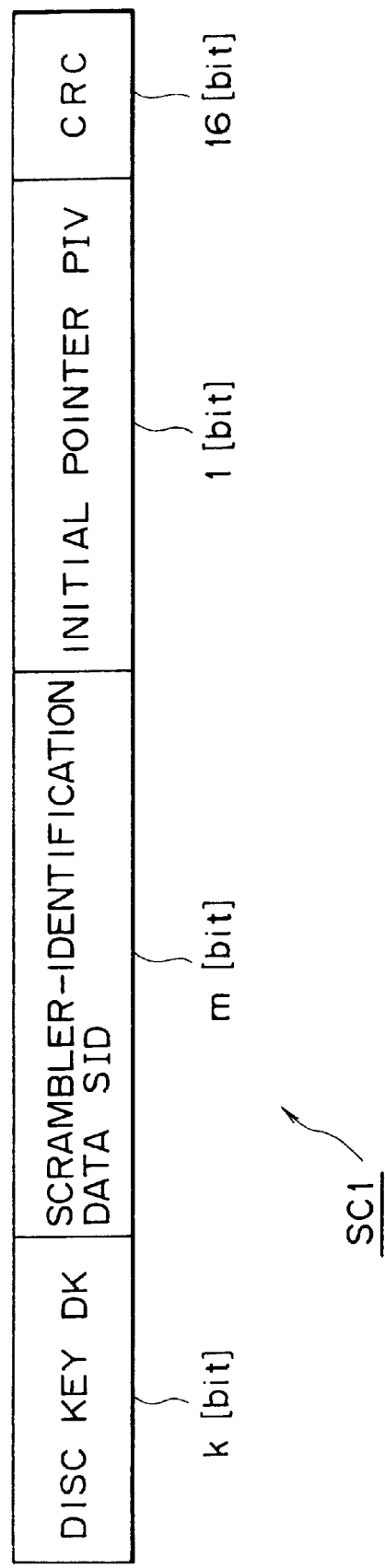
FIG. 9 is a diagram showing the structure of control data SC1 provided by the present invention.

FIG. 9 is a diagram showing the format of the control data SC1. As shown in the figure, the control data SC1 comprises the disc key DK, the scrambler-identification data SID, the initial pointer PIV and an error correction code CRC (Cyclic Redundancy Check) with a length of 16 bits. These pieces of data are laid out at random in accordance with a predetermined rule to make it difficult to decode them.

The control data SC1 is supplied to the second modulation circuit 47 in sequential cycles at a low transfer speed of 1 bit per frame with the frame clock signal FCK taken as a reference during a period corresponding to the lead-in area of the optical disc 26. During periods corresponding to program and lead-out areas of the optical disc 26, on the contrary, the operation to supply the control data SC1 to the second modulation circuit 47 is halted.

Figure 10:
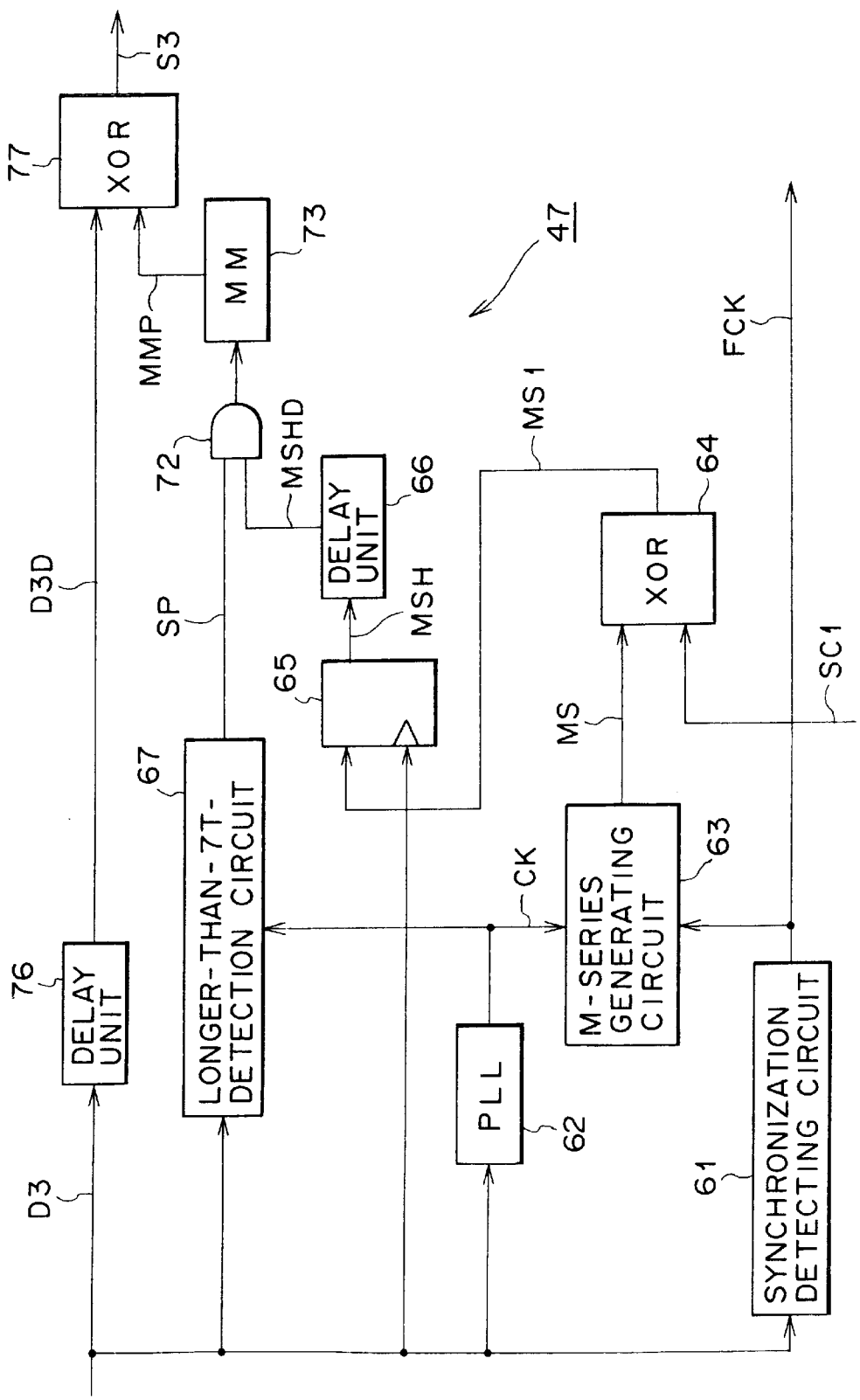
FIG. 10 is a block diagram showing a second modulation circuit 47 employed in the disc recording apparatus shown in FIG. 5.

FIG. 10 is a block diagram showing the second modulation circuit 47 in detail. A synchronization detecting circuit 61 employed in the second modulation circuit 47 detects frame syncs from the modulated data D3, outputting the frame clock signal FCK.

FIGS. 11A and 11B show timing charts of the operation of the second modulation circuit 47. As shown in the figure, a PLL circuit 62 reproduces the channel clock signal CK shown in FIG. 11B from the modulated data D3 shown in FIG. 11A as an output signal shown in FIG. 11B.

An M-series generating circuit 63 comprises a plurality of flip-flop circuits cascaded to each other and an exclusive OR circuit. After initial values are set in these flip-flop circuits with the frame clock signal FCK used as a timing reference, the set initial values are sequentially transferred in synchronization with the channel clock signal CK and fed back at predetermined intervals of the cascaded flip-flop circuits to generate random data MS, that is, an M-series data wherein logic values of 0 and 1 appear at equal probabilities. As a result, the M-series signal MS is output by the M-series generating circuit 63 as a sequence of pseudo-random numbers repeating the same pattern for each 1-frame period.

An exclusive OR (XOR) circuit 64 inputs the Mseries signal MS and the control data SC1 for outputting an exclusive logical sum signal MS1 shown in FIG. 11D. When the control data SC1 has a logic value of 0, the exclusive OR circuit 64 generates the exclusive logical sum signal MS1 having the same logic levels as the M-series signal MS. When the control data SC1 has a logic value of 1, on the other hand, the exclusive OR circuit 64 generates the exclusive-logical sum signal MS1 having the inverted logic levels of those of the M-series signal MS. In this way, the exclusive OR circuit 64 modulates the control data SC1, to which 1-bit data is assigned, by using the M-series random numbers during the 1-frame period.

A flip-flop circuit 65 latches the exclusive-logical sum signal MS1 with timing of the rising edge of the modulated data D3 as shown in FIG. 11E. In this embodiment, the modulated signal S3 is generated raising a signal level in response to the rising edge of the level of the modulated signal D3. Pits are created on the disc raw plate 42 during the signal level rising period of the modulated signal S3. In this way, the flip-flop circuit 65 samples the logic level of the exclusive logical sum signal MS1 with timing of the front edge of each pit and holds a result of sampling till the timing corresponding to the front edge of the succeeding pit.

A delay circuit 66 delays data MSH latched in the flip-flop circuit 65 by a predetermined period of time for outputting a delayed signal MSHD shown in FIG. 11F. The delay period is a period of time required by a longer-than-7T-detection circuit 67 to carry out processing, that is, a period of time of about five clocks of the channel clock signal CK.

The longer-than-7T-detection circuit 67 detects the pulse width of the modulated data D3. When a pulse width of the modulated data D3 corresponding to a period of at least 7T or greater is detected, the longer-than 7T-detection circuit 67 outputs a detection pulse SP with a pulse width equal to the width of 1 channel clock as shown in FIG. 11G.

Figure 12:
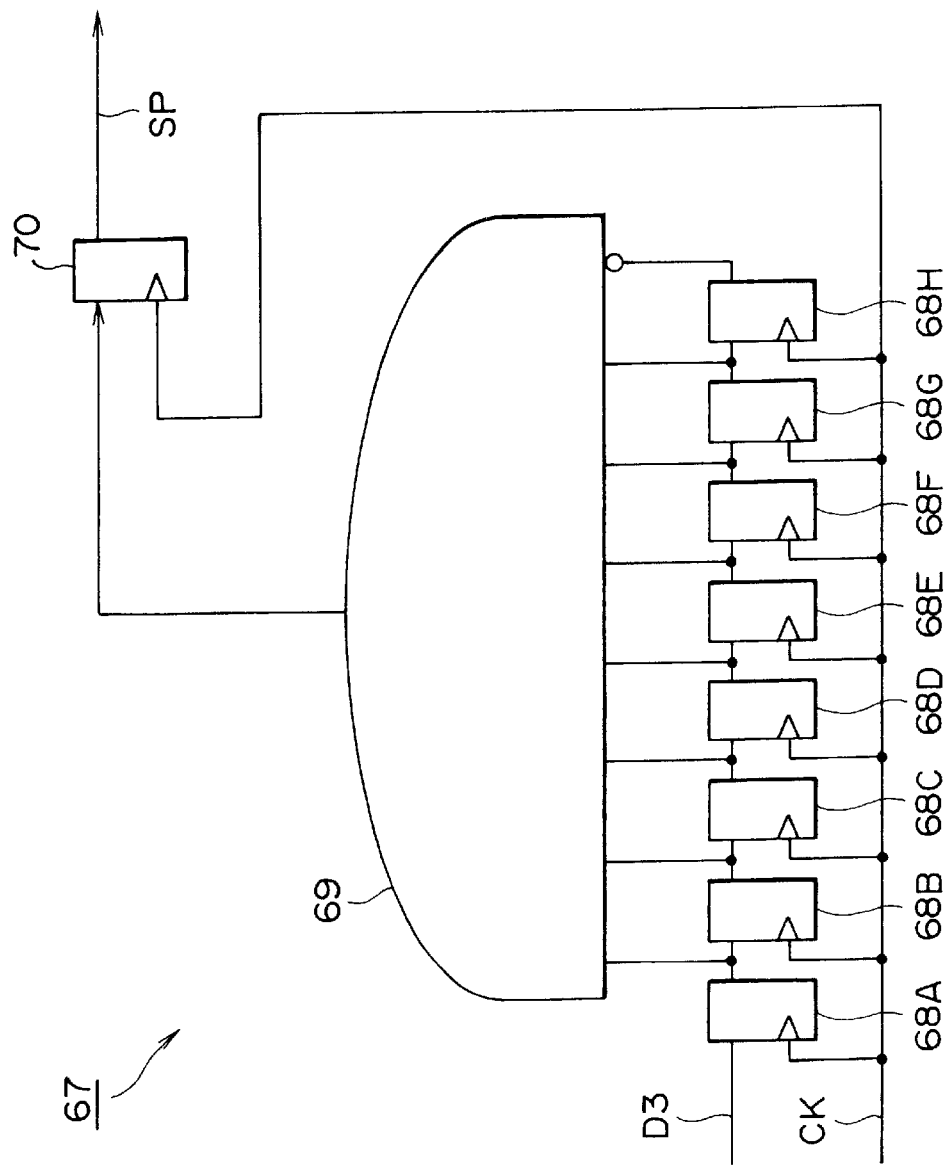
FIG. 12 is a block diagram showing a longer-than-7T-detection circuit employed in the second modulation circuit shown in FIG. 10.

As shown in FIG. 12, the longer-than-7T-detection circuit 67 comprises eight latch circuits 68A to 68H provided at eight stages for sequentially latching and transferring the modulated data D3 from stage to stage in synchronization with the channel clock signal CK.

An AND circuit 69 inputs latched signals output by the latch circuits 68A to 68H in parallel as they are except the signal output by the last-stage latch circuit 68H which is inverted before being supplied thereto. The AND circuit 69 generates a signal representing a logical product of the signals output by the latch circuits 68A to 68H. In this way, the AND circuit 69 outputs a logical-product signal rising to a logic value of 1 only when the AND circuit 69 sees the modulated data D3 as a sequence of one logic value of 0 and seven logic values of 1 synchronously with the channel clock signal CK, that is, only when a pit having a length equal to or longer than a period of 7T is created where T is the basic period of the modulated data D3.

A latch circuit 70 latches the logical-product signal generated by the AND circuit 69 for outputting a detection pulse SP.

An AND circuit 72 shown in FIG. 10 inputs the detection pulse SP and the delay signal MSHD generated by the delay circuit 66, outputting a signal representing the logical product of the detection pulse SP and the delay signal MSHD.

Triggered by a signal output by the AND circuit 72, the mono-stable multivibrator (MM) 73 outputs a modulation pulse MMP shown in FIG. 11H with a predetermined pulse width smaller than one period of the channel clock signal CK. It should be noted that the pulse width is set at such a value that, when radiation of the laser beam L is temporarily halted by the modulation pulse MMP, the pit width on an optical disc created on the disc raw plate 42 is reduced due to the temporary suspension of the radiation by an amount of about 10% of an average pit width.

Figure 11:
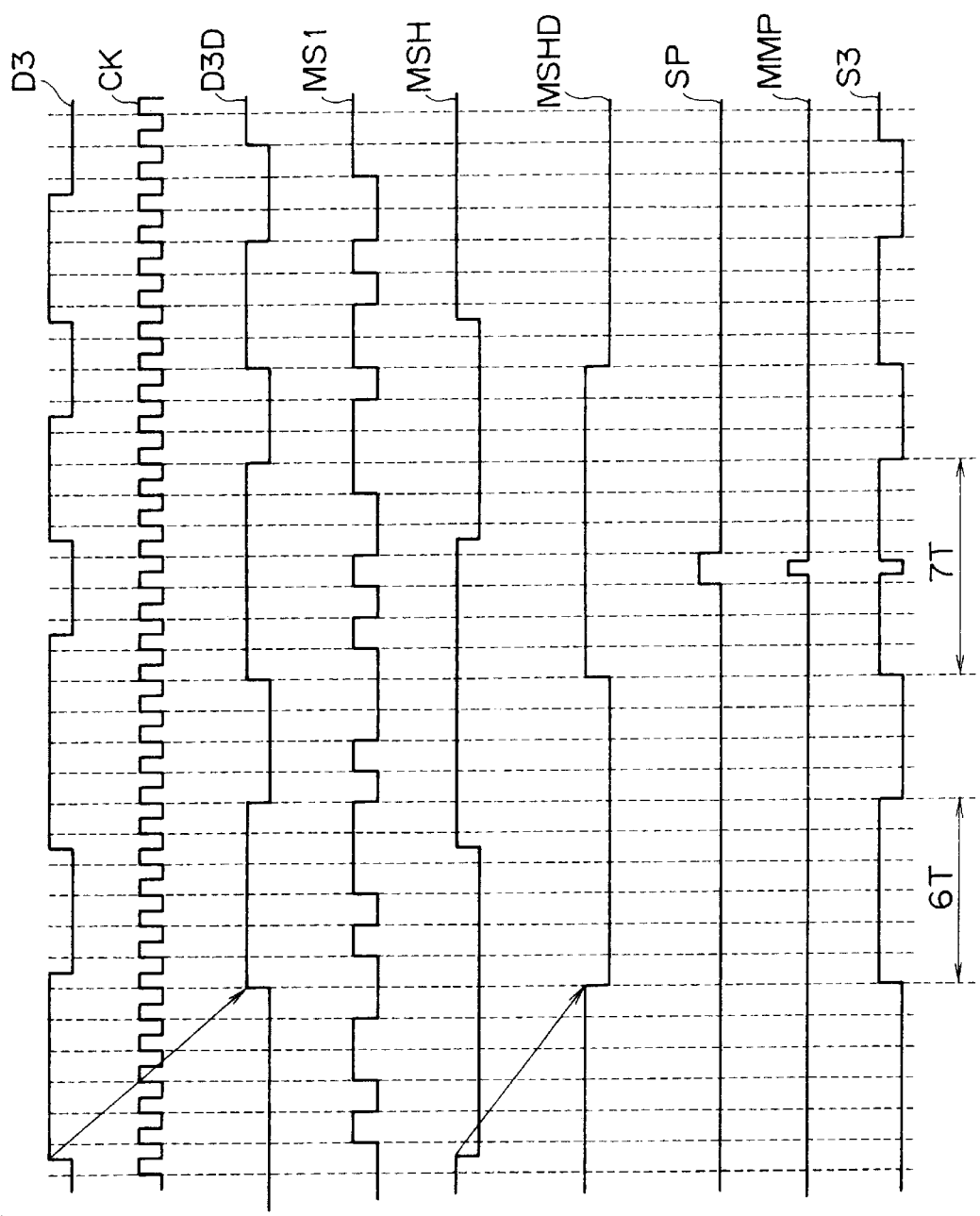
FIG. 11A is a timing chart of modulated data D3.
FIG. 11B is a timing chart of a channel clock signal CK extracted from the modulated data D3.
FIG. 11C is a timing chart of a delayed signal D3D obtained as a result of delaying modulated data D3 by means of a delay circuit 7.
FIG. 11D is a timing chart of an exclusive-logical-sum signal MS1.
FIG. 11E is a timing chart of a signal MSH obtained as a result of latching the exclusive-logical-sum signal MS1 on a rising timing of the modulated data D3.
FIG. 11F is a timing chart of a delayed signal MSHD obtained as a result of delaying the signal MSH by a predetermined delay time.
FIG. 11G is a timing chart of a detection pulse SP detected by a longer-than-7T detection circuit 67.
FIG. 11H is a timing chart of a modulation pulse MMP.
FIG. 11I is a timing chart of a modulated signal S3 obtained as a result of modulation of the modulated data D3 by using control data SC1.

A delay unit 76 delays the modulated data D3 by a period of time equal to about five clocks, outputting delayed demodulated data D3D shown in FIG. 11C. The delayed modulated data D3D shown in FIG. 11 is supplied to an exclusive OR (XOR) circuit 77 for computing an exclusive logical sum of the delayed modulated data D3D and the modulation pulse MMP. The exclusive OR circuit 77 generates the exclusive logical sum as a modulated signal S3 obtained as a result of modulation of the modulated data D3 by using the control data SC1 as shown in FIG. 11I.

The delay time of the delay unit 76 is set at such a value that, for a pit with a width equal to or longer than a period of 7T, information on the position of the edge of this pit detected in a playback operation is not affected by a variation in pit width caused by the modulation pulse MMP. To put it concretely, the delay time of the delay unit 76 described above is set at such a value that a switch in logic level of the modulated signal S3 corresponding to the modulation pulse MMP occurs with timing separated away from the rising-edge timing of the modulated data D3 by a predetermined period of time. In this embodiment, this timing is set so that the rising edge of the modulation pulse MMP is delayed from the rising edge of the associated modulated data D3D by a period of time equal to about 3T. In addition, by generating a modulation pulse MMP for a pit with a width of the period of 7T or greater, the falling edge of the modulation pulse MMP leads ahead of the falling edge of the associated modulated data D3D by a period of time of at least about 3T or greater.

Figure 13:
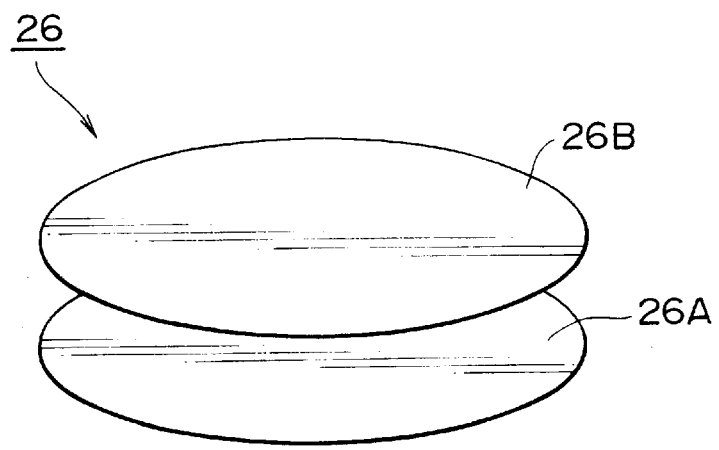
FIG. 13 is a diagram showing an exploded perspective view of double-layer optical disc 26 produced by the disc recording apparatus shown in FIG. 5.
Figure 14:
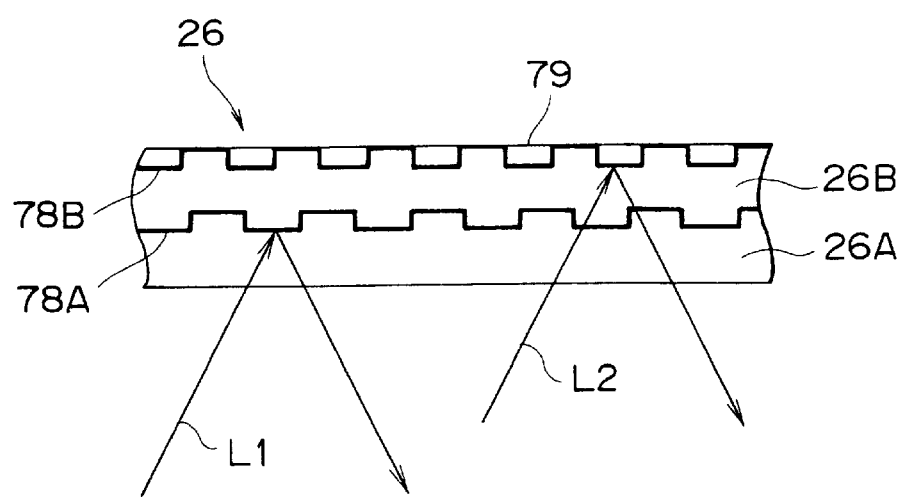
FIG. 14 is a diagram showing the cross section view of the double-layer optical disc shown in FIG. 13.

FIG. 13 is a diagram showing an exploded perspective view of optical disc 26 produced from the disc raw plate 42 which is created by recording the digital audio signal D1 thereon as described above. The optical disc 26 is created by forming predetermined reflective films 78A and 78B on disc plates 26A and 26B respectively, then stacking the disc plates 26A and 26B on each other and finally sticking a protective film 79 as shown in FIG. 14.

Assume that the protective film 79 faces upper side, so the protective film 71 and the disc plate 26A are used as an upper-side and lower-side layers of the optical disc 26 respectively. In this case, the reflective film 78A stuck to the disc plate 26A is made of a reflective film having a waveform selecting characteristic. To be more specific, the reflective film 78A exhibits a high reflectance with respect to a laser beam L1 having a wavelength of 650 nm for an information recording surface of the reflective film 78A. With respect to a laser beam L2 having a wavelength of 780 nm for an information recording surface of the reflective film 78B, on the other hand, the reflective film 78A exhibits a light transmitting characteristic.

Thus, by radiating the laser beams L1 and L2 with wavelengths of 650 nm and 780 nm respectively from the lower-layer disc plate 26A of the optical disc 26, it is possible to receive lights reflected by the reflective films 78A and 78B.

The disc plates 26A and 26B are made of transparent resin such as poly-carbonate by injection molding using a stamper. The thickness of each of the disc plates 26A and 26B is set at a value equal to ½ of the plate thickness of a compact disc.

The stamper for making the lower-layer disc plate 26A is created from a mother disc which is made by adopting an electrocasting technique after a disc raw plate 42 completing an exposure process carried out by the optical-disc recording apparatus 40 has been developed.

On the other hand, the stamper for making the upper-layer disc plate 26B is created by processing the same source as a digital audio signal D1 assigned to the lower-layer disc plate 26A in the same format as the conventional compact disc. That is to say, a digital audio signal quantized by multi-bits after a sampling operation at a sampling frequency of 44.1 kHz is subjected to EFM modulation before being recorded onto the stamper for making the upper-layer disc plate 26B.

As a result, the optical disc 26 can be mounted on the conventional compact disc player for receiving a light reflected by the upper-layer reflective film 78B and allows the player to process the reflected light to reproduce an audio signal having the same contents as the digital audio signal D1. In addition, a series of pits is formed on the lower-layer reflective film 78A at a density higher than that of the upper-layer reflective film 78B. A special playback apparatus is capable of processing a playback signal obtained from the lower-layer reflective film 78A to reproduce a digital audio signal D1 having a high sound quality in comparison with an audio signal played back from the upper-layer reflective film 78B.

Figures 15A, 15B:
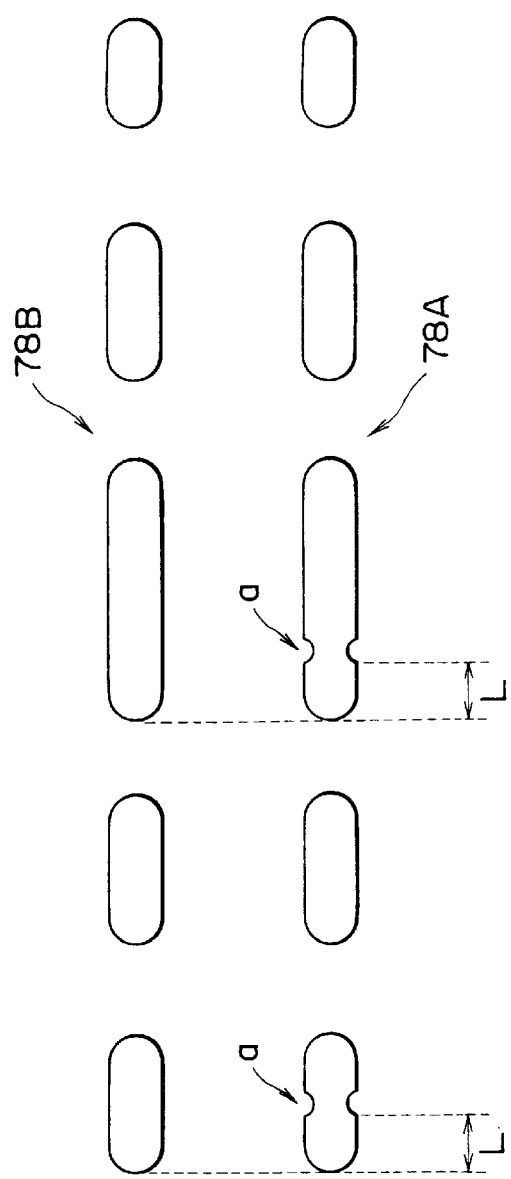
FIG. 15A is a model diagram showing shapes of pits created at a low-density layer on the optical disc shown in FIG. 13.
FIG. 15B is a model diagram showing shapes of pits created at a high-density layer on the optical disc shown in FIG. 13.

FIGS. 15A and 15B are diagrams showing respectively an enlarged portion of the upper-layer reflective film 78B and an enlarged portion of the lower-layer reflective film 78A facing each other. The upper-layer reflective film 78B shown in FIG. 15A is formed merely as a repetition of pits and lands representing audio data with each pit having a length equal to an integral multiple of a clock period T of the channel clock signal CK, that is, an integral multiple of a basic period. On the lower-layer reflective film 78A, on the other hand, each pit with a length corresponding to a period of at least 7T or greater is formed to have a locally reduced pit width in dependence on the control data SCa shown in FIG. 9 at a location separated from the front edge of the pit by a predetermined distance L equivalent of 3T as indicated by an arrow a. That is to say, the control data SC1 is recorded as this reduced pit width.

Figure 16:
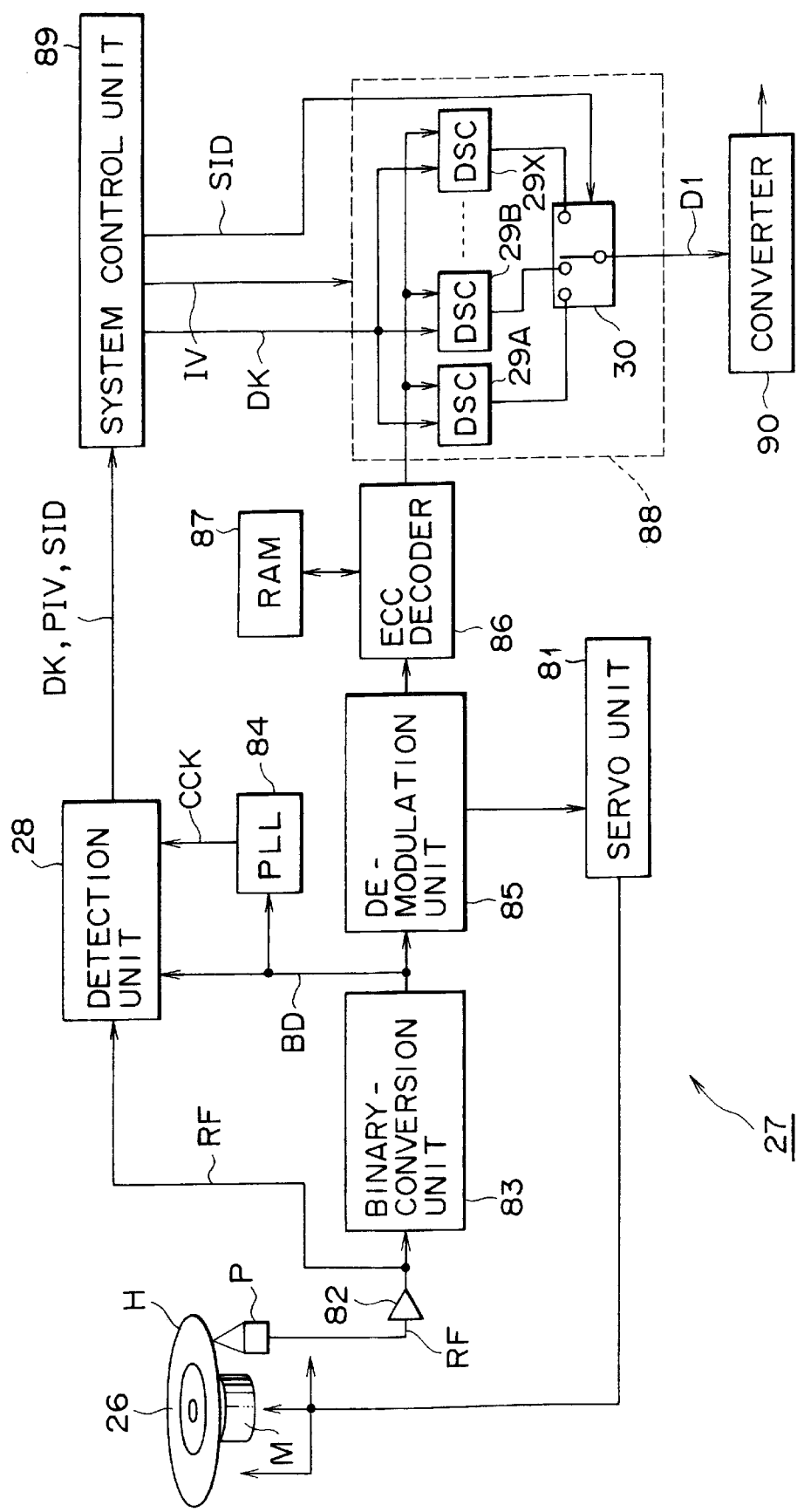
FIG. 16 is a block diagram showing a playback apparatus for reproducing information from the optical disc shown in FIG. 13.

FIG. 16 is a block diagram showing a special playback apparatus 27 for reproducing a playback signal from the optical disc 26 manufactured as described above. In this playback apparatus 27, the spindle motor M drives the optical disc 26 into rotation under a condition of a constant linear speed controlled by a servo unit 81.

An optical pickup P radiates a laser beam with a wavelength of 650nm to the optical disc 26 to obtain a light reflected by the lower-layer reflective film 78A of the optical disc 26. The optical pickup P then generates a playback signal RF having a level varying with the quantity of the reflected light. The level of the playback signal RF varies in accordance with the widths of pits formed on the reflective film 78A of the optical disc 26 as described above. That is to say, since the pit width is reduced locally by about 10% of the average pit width on the optical disc 26, the level of the playback signal varies due to this reduced pit width. Because the pit width is reduced at a position separated from the front edge of the pit, the reduced pit width does not have an effect on edge timing. As a result, timing with which the playback signal RF crosses a reference level of binary identification is sustained to give the same timing as the playback signal having a pit with no reduced width.

An amplifier circuit 82 carries out waveform equalization on the playback signal RF prior to amplification at a predetermined gain to generate an amplified playback signal RF. A binary-conversion unit 83 performs binary conversion on the amplified playback signal RF based on a predetermined reference level, converting the playback signal RF into a binary-data signal BD. Even though the pit width on the optical disc 26 is reduced locally by about 10%, the local reduction in pit width is not detected from the binary-data signal BD.

A PLL circuit 84 operates with the binary-data signal BD taken as a timing reference to reproduce the channel clock signal CCK of the playback signal RF.

An EFM-demodulation unit 85 sequentially latches the binary-data signal BD with this channel clock signal CCK taken as a timing reference to reproduce playback data for the modulated data D3 generated by the optical-disc recording apparatus 40. After demodulating the playback data into EFM signal, the EFM (Eight-to-Fourteen Modulation)-demodulation unit 85 further delimits the demodulated data in units each comprising a predetermined number of bits with the frame sync taken as a reference. Then, the data delimited in units each comprising a predetermined number of bits is subjected to deinterleave processing before being supplied to an ECC (Error Correction Code) decoder 86.

After receiving data output by the EFM-demodulation unit 85 and storing the data into a RAM (Random-Access Memory) unit 87, the ECC decoder 86 performs deinterleave processing on the data by reading back the data from the RAM unit 87 in a predetermined order. The ECC decoder 86 further carries out error-correction processing on this output data by using error-correction codes added to the playback data. As a result, the ECC decoder 86 reproduces playback data corresponding to the modulated data D2 generated by the optical-disc recording apparatus 40.

A descramble unit 88 comprises the descramblers (DSC) 29A to 29X and the select circuit 30 described earlier by referring to FIG. 4. The descramble unit 88 descrambles the playback data generated by the ECC decoder 86, producing the demodulated digital audio signal D1. The descramblers 29A to 29X are configured respectively as counterparts of the scramblers 25A to 25X described earlier by referring to FIG. 6. The descramblers 29A to 29X operate to descramble the playback data by using the initial values IV and the disc key DK set for each sector by a system control unit 89. The select circuit 30 selects one of descrambling results output by the descramblers 29A to 29X corresponding to one of the scramblers 25A to 25X specified by the scrambler-identification data SID output by the system control unit 89, outputting the result of the descramble processing.

A converter 90 outputs the digital audio signal D1 generated by the descramble unit 88 in a predetermined format.

The system control unit 89 is implemented by a computer for controlling the operation of the playback apparatus 27. When the optical disc 26 is mounted on the playback apparatus 27, the system control unit 89 controls the overall operations so as to make an access to the lead-in area on the optical disc 26 to acquire data such as a TOC (Table of Contents) recorded in the lead-in area.

At the same time, the system control unit 89 acquires the scramble-identification data SID, the initial pointer PIV and the disc key DK detected by a detection unit 91 and uses the scramble-identification data SID and the disc key DK for controlling the operation of the descramble unit 88 in the operation to playback a signal from the program area on the optical disc 26 following the lead-in area.

The system control unit 89 switches over the contact point of the select circuit 30 so as to select a particular output of a descrambler identified by the acquired scrambler-identification data SID. In this way, the data output by the ECC decoder 86 is put into a descrambled state. The acquired disc key DK is supplied to each of the descramblers 29A to 29X.

In addition, the system control unit 89 uses the acquired initial pointer PIV to fetch the initial value IV which is associated with the initial pointer PIV and stored in a memory embedded in the system control unit 89. The initial value IV is supplied to the descrambler unit 88 in an operation to play back a signal from the program area.

The detection unit 91 detects control data SC1 from the playback signal SF output by the amplifier circuit 82 and supplies the scrambler-identification data SID, the initial pointer PIV and the disc key DK extracted from the control data SC1 to the system control unit 89.

Figure 17:
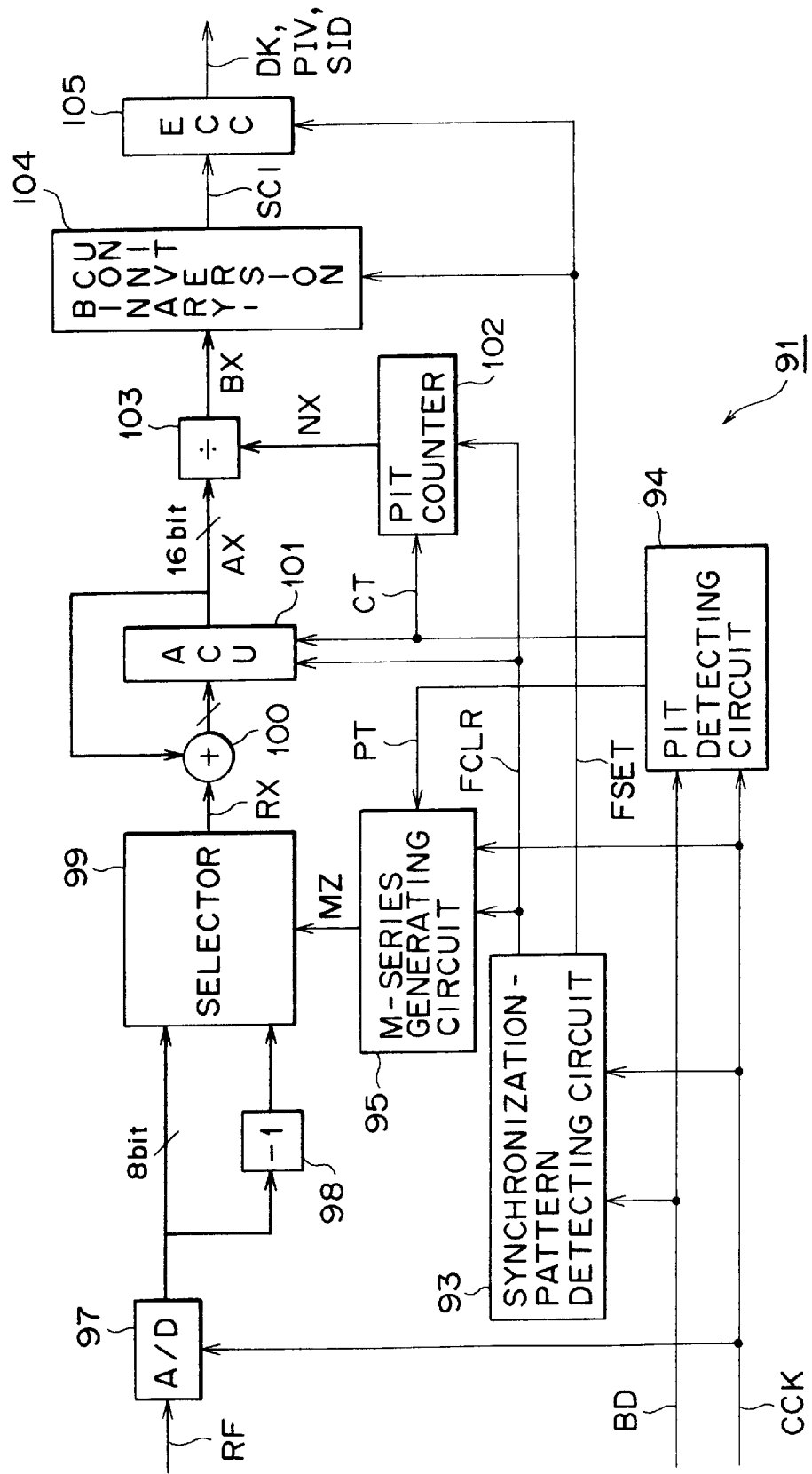
FIG. 17 is a block diagram showing a detection unit 91 employed in the playback apparatus shown in FIG. 16.
Figures 18A, 18B, 18C, 18D, 18E:
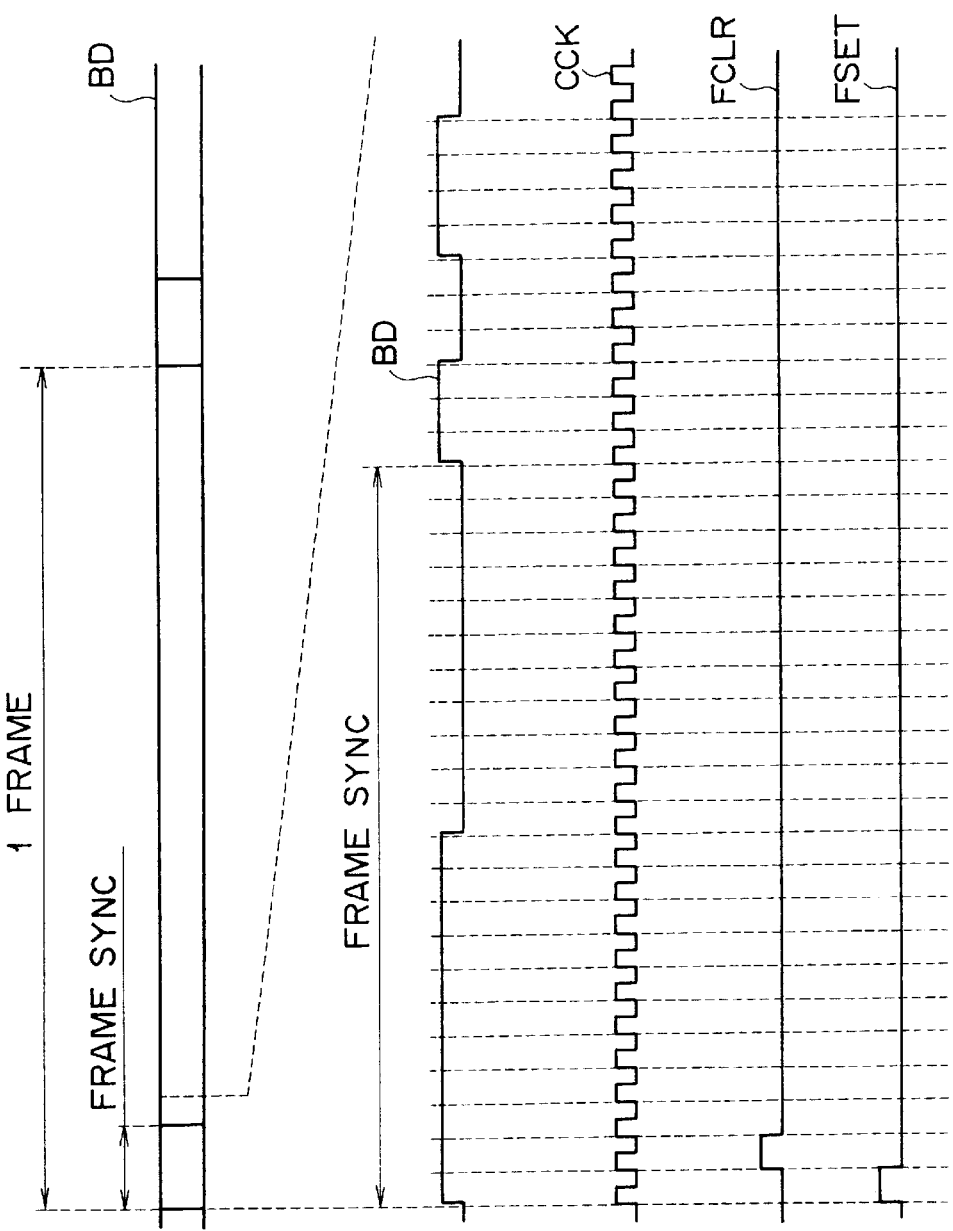
FIG. 18A is a timing chart of demodulated data BD.
FIG. 18B is a timing chart of demodulated data BD extended in the time-axis direction.
FIG. 18C is a timing chart of a channel clock signal CCK.
FIG. 18D is a timing chart of a clear pulse FCLR.
FIG. 18E is a timing chart of a set pulse FSET.

FIG. 17 is a block diagram showing the detection unit 91. A synchronization-pattern detecting circuit 93 employed in the detection unit 91 sequentially latches the binary-data signals BD shown in FIGS. 18A and 18B with the channel clock signal CCK of FIG. 18C taken as a timing reference and, by judging the consecutive logic levels, detects the frame sync. Furthermore, the synchronization-pattern detecting circuit 93 uses the detected frame sync as a timing reference for generating a set pulse FSET with a signal level rising during one period of the channel clock signal CCK at the beginning of a frame as shown in FIG. 18E and for generating a clear pulse FCLR with a signal level rising during one period of the channel clock signal CCK following the period for the set pulse FSET as shown in FIG. 18D.

A pit detecting circuit 94 has the same configuration as the longer-than-7T-detection circuit 67 employed in the optical disc recording apparatus 40 shown in FIG. 10. The pit detecting circuit 94 receives the binary-data signal BD transferred thereto with the channel clock signal CCK taken as a timing reference for detecting timing of the binary-data signal BD corresponding to a pit having a length corresponding to the period of at least 7T or greater. Furthermore, the it detecting circuit 94 generates and outputs a rising signal PT having the signal level thereof rising with the timing of the start of the detected pit. In addition, the pit detecting circuit 94 outputs a gate signal CT with the rising edge thereof lagging behind the rising edge of the signal PT by a predetermined period of time. It should be noted that this gate signal CT is the counterpart of the modulation pulse MMP generated in the second modulation circuit 47 employed in the optical-disc recording apparatus 40. However, the gate signal CT is different from the modulation pulse MMP in that the level of the former rises at a pit having a length corresponding to a period of at least 7T or greater.

An address of a location in a read-only memory embedded in an M-series generating circuit 95 is initialized by the clear pulse FCLR supplied by the synchronization-pattern detecting circuit 93. Thereafter, the address is sequentially incremented by the channel clock signal CCK. At the same time, data at the address is accessed sequentially to generate an M-series signal corresponding to the M-series signal MS generated by the optical-disc recording apparatus 40. In addition, the M-series generating circuit 95 latches and outputs the M-series signal with the rising signal PT supplied from the pit detecting circuit 94 used as a timing reference. Thus, after latching the M-series signal with timing of start point of a pit having a length corresponding to a period of at least 7T or greater, the M-series generating circuit 95 outputs an M-series latch signal MZ which holds the latched logic level till the start point of the following pit having a length corresponding to a period of at least 7T or greater.

An analog/digital (A/D)-conversion circuit 97 converts the analog playback signal RF into an 8-bit digital playback signal with the channel clock signal CCK used as a timing reference. A polarity inverting (−1) circuit 98 inverts the polarity of the digital playback signal and outputs it.

A selector 99 selects the digital playback signal supplied directly thereto by the A/D-conversion circuit 97 or the digital playback signal with the polarity thereof inverted by the polarity inverting circuit 98 in accordance with the M-series latch signal MZ output by the M-series generating circuit 95. To be more specific, the selector 99 selects the digital playback signal supplied directly thereto by the A/D-conversion circuit 97 and outputs it if the M-series latch signal MZ has a logic value of 1. If the M-series latch signal MZ has a logic value of 0, on the other hand, the selector 99 selects the digital playback signal with the polarity thereof inverted by the polarity inverting circuit 98. As a result, the selector 99 allows generation of logic levels of the control data SC1 modulated by the M-series signal MS by using multi-value data. That is to say, the selector 99 outputs playback data RX based on the multi-value data.

A 16-bit digital adder 100 adds the playback data RX to data AX output by an accumulator (ACU) 101, supplying back the sum to the accumulator 101. The accumulator 101 is implemented by a 16-bit memory for storing data output by the adder 100. Since the data stored in the accumulator 101 is fed back to the adder 100, the accumulator 101 forms an accumulative adder in conjunction with the adder 100. After the contents of the accumulator 101 are cleared by the clear pulse FCLR, data output by the adder 100 is stored into the accumulator 101 with timing determined by the gate signal CT. As a result, the adder 100 cumulates logical values of the playback data RX output by the selector 99 and the accumulator 101 outputs the cumulative value AX.

After the contents of a pit counter 102 are cleared also by the clear pulse FCLR, the pit counter 102 counts the number of gate signal CT. That is to say, the pit counter 102 counts the number of pits, the playback data RX of which is cumulated in the accumulator 101, outputting a count value NX.

A division (÷) circuit 103 divides the cumulative value AX output by the accumulator 101 by the count value NX to find an average of logical values of the playback data RX generated by the selector 99. A binary-conversion unit 104 converts the played back data BX output by the division circuit 103 into binary data by using a predetermined reference value, generating the binary control data SC1 at the timing with which the set pulse FSET rises. In this way, the playback data RX of the control data SC1 played back by the selector 99 is converted into the control data SC1.

An ECC circuit 105 carries out error-correction processing on the control data SC1 by using an error-correction code CRC added to the control data SC1, outputting the scrambler-identification data SID, the initial pointer PIV and the disc key DK assigned to the control data SC1 to the system control unit 89.

With the configuration described above, the disc producing apparatus 21 specifies one of the scramblers 25A to 25X in accordance with the scrambler-identification data SID during a process of manufacturing the optical disc 26 provided by the embodiment to determine the type of the scramble processing shown in FIG. 4. A scrambled digital audio signal D1 obtained as a result of the scramble processing based on the disc key DK, one of pieces of information set in the scramblers 25A to 25X, is then recorded into the optical disc 26. In addition, in the case of a pit with a length corresponding to a period of at least 7T or greater in the lead-in area of the optical disc 26, the pit witdth is modulated by using information such as the disc key DK and the scrambler-identification data SID in order to record information such as the disc key DK and the scrambler-identification data SID in such a way that the recorded disc key DK and scrambler-identification data SID are difficult to decode.

Then, the playback apparatus 27 reproduces the information such as the disc key DK and the scrambler-identification data SID which has been recorded on the optical disc 26 in such a way that the information is difficult to decode and uses the reproduced disc key DK and scrambler-identification data SID to select one of outputs of the descramblers 29A to 29X and, thus, to determine the type of the descrramble processing to descramble the digital audio signal D1 by using the disk key DK.

That is to say, in the process of manufacturing the optical disc 26, the optical-disc recording apparatus 40 shown in FIG. 5 makes the optical disc 26 by first performing sampling at a sampling frequency of 2.8224 MHz and then making a mother/disc by a sequential exposure process of the disc raw plate 42 with a digital audio signal D1 having a high sound quality completing 1-bit quantization, and finally making the optical disc 26 from the mother disc.

In the exposure process of the disc raw plate 42, the scramble circuit 51 carries out sequential scramble processing on the digital audio data D1 by using the data disc key DK having a length of k bits and the initial value IV having a length of r bits as shown in FIG. 9 in a scramble-processing way determined by one of the scramblers 25A to 25X which is selected by the scrambler-identification data SID. The disc key data DK and the initial value IV are set for each sector. The scrambled data is difficult to decode in comparison with data obtained from single-system-scrambler scramble processing. In addition, the initial values IV for the scramblers 25A to 25X are indicated by initial pointers PIV which are different from each other as shown in FIG. 7. As a result, data is scrambled in such a way that it is difficult to identify which scrambler has been used for the scramble processing. In addition, the initial value IV causes even a digital audio signal D1 comprising consecutive logic values of 0 to be processed in scramble processing based on random logic levels to produce a scramble processing result D3.

The digital audio signal D2 obtained as a result of scrambling carried out in this way as shown in FIG. 5 is supplied to the modulation circuit 52 for adding sub-code data and error-correction codes to the signal D2 before interleave processing. Data completing the intreleave processing is then subjected to a predetermined modulation system to be converted into the modulated data D3.

The modulated data D3 is generated to have repetitive signal-level raising and falling edges in the range of 3T to 11T where a period T is the basic period of a clock signal CK and the range low limit 3T is longer than a minimum period in which it is possible to suppress inter-code interference in the pit-series direction within a range sufficient for practical purposes in the optical system of the playback apparatus. In addition, frame syncs are inserted into the modulated data D3 at predetermined intervals as shown in FIG. 8B to generate the data D3 in a frame structure with a sync frame used as a unit.

The modulated data D3 resulting from modulation based on the digital audio signal D1 generated in this way is supplied to the optical modulator 46 through the second modulation circuit 47 shown in FIG. 10 as a modulated signal S3. As for the lead-in area, the modulated data D3 resulting from modulation based on the data string of TOC in place of the digital audio signal D1 is supplied to the optical modulator 46 through the second modulation circuit 47 shown in FIG. 7 as the modulated signal S3.

As a result, the optical modulator 46 is driven by the modulated signal S3 to record the digital audio signal D1 along with the data string of the TOC on the disc raw plate 42 as a repetition of lands and pits each having a length equal to an integral multiple of a basic unit corresponding to one period of the channel clock signal CK.

In the conversion of the modulated data D3 into a modulated signal S3, the modulated signal S3 is generated to represent signal levels of the modulated data D3 in the case of regions other than the lead-in area as shown in FIG. 15A. In the case of the lead-in area, on the other hand, the modulated signal S3 is generated by locally switching the logic level of the modulated data D3 from a high logic level to a low logic level or vice versa as shown in FIG. 15B.

Thus, a pit with a locally narrow width is created in the series of pits formed on the disc raw plate 42. As a result, the pit width is locally modulated to record the control data SC1 comprising the disc key DK, the scrambler-identification data SID, the initial pointer PIV and the 16-bit error-correction code CRC shown in FIG. 9 onto the disc raw plate 42.

That is to say, the control data SC1 comprising the disc key DK, the scrambler-identification data SID, the initial pointer PIV for identifying the initial value IV and the error-correction code CRC laid out at random therein as shown in FIG. 9 is supplied to the second modulation circuit 47 as a binary number having a low frequency with 1 bit assigned to one frame.

The M-series generating circuit 63 employed in the second modulation circuit 47 shown in FIG. 10 generates random-number data MS of the M-series repeated for every frame period synchronously with the channel clock signal CK. The exclusive OR circuit 64 generates an exclusive logical sum of the random-number data MS of the M-series and the control data SC1. Thus, the control data SC1 is modulated by the random-number data MS. Since the logic value of 1 and the logic value of 0 appear in the random number of the M-series at equal probabilities, the control data SC1 is modulated into an exclusive-logical sum signal MS1 in which the logic value of 1 and the logic value of 0 also appear at equal probabiities. As a result, the control data SC1 is recorded onto the optical disc 26 in such a way that it is difficult to decode the control data SC1.

Furthermore, the flip-flop circuit 65 latches the exclusive logical sum MS1 on the rising edge of the modulated data D3 corresponding to the edge of each pit. In addition, the longer-than-7T-detection circuit 67 detects the rising edge of the logic level of the modulated data D2 corresponding to a pit with a length corresponding to a period of at least 7T or greater where a period T is the basic period. The AND circuit 72 selects a result latched in the flip-flop circuit 65 corresponding to the rising timing of the logic level detected by the longer-than-7T-detection circuit 67. The mono-stable multivibrator 73 is driven by a signal output by the AND circuit 72. As a result, the logic level of the modulated data D2 is logically switched from the logic value of 0 to the logic value of 1 or vice versa by a signal output by the mono-stable multivibrator 73 in the exclusive OR circuit 77.

Thus, the control data SC1 is recorded onto the disc raw plate 42 with a pit width locally reduced in the case of a pit having a length corresponding to a period of at least 7T or greater. In addition, a series of pits are sequentially recorded onto the disc raw plate 42 with a pit width locally reduced for a case in which the logical product of the random-number data MS of the M-series and the control data SC1 is the logic value of 1 and the pit length corresponds to a period of at least 7T or greater.

In an operation to generate the modulated data S3 with a locally reduced pit width by switching the logic level of the modulated data D3 from the logic value of 0 to the logic value of 1 or vice versa as described above, the modulated data D3 is delayed by the delay unit 76 and supplied to the exclusive OR circuit 77 along with the modulation pulse MMP output by the mono-stable multivibrator 73. As a result, the logic level of the modulated data S3 is switched from the logic value of 0 to the logic value of 1 or vice versa. However, the modulated data S3 is set so that information on the position of the edge of a pit detected during a playback operation is not affected by switching the logic level of the modulated data S3.

Assuming that the pit width of a pit with a length corresponding to a period of at least 7T or greater is reduced locally, the delay time of the delay unit 76 is set so that the rising edge of the delayed modulated data D3D output by the delay unit 76 leads ahead of the rising edge of the modulation pulse MMP by a period of at least about 3T. As a result, the logic level of the modulated signal S3 corresponding to the modulation pulse MMP is switched from the logic value of 1 to the logic value of 0 or vice versa with timing separated away from the timing of the rising edge of the modulated data D3 by a predetermined period corresponding to a distance L from the edge of the pit shown in FIG. 15B.

As a result, the modulation pulse MMP is generated so that the pit width is reduced at a position separated away from the front and rear edges it at a distance of corresponding to a period of at least 3T or greater where the period of 3T is a minimum period allowing inter-code interference in the pit-series direction to be reduced sufficiently for practical purposes in the playback system. By changing the pit width, generation of jitters can be avoided effectively and information such as the digital audio signal D1 and the TOC data recorded on the optical disc 26 as a series of pits can thus be played back. That is to say, reduction of a phase margin in a playback signal can be avoided.

In addition, the width of the modulation pulse MMP output by the mono-stable multivibrator 73 is set at a value smaller than one period of the channel clock signal CK. Thus, the pit width is reduced by 10% of the average pit width to result in forming a locally narrow pit. As a result, reduction of an amplitude margin caused by recording of the control signal SC1 is also avoided and incorrect binary identification of the playback signal RF can thus be prevented.

In addition, by recording the control data SC1 with a local reduction of 10% in pit width and by modulating the control data SC1 by using the random-number data MS of the M-series in which the logic value of 1 and the logic value of 0 appear at equal probabilities, variations in playback signal RF due to variations in pit width are observed as if noise has been introduced into the playback signal RF. As a result, the control data SC1 can be made difficult to observe and to decode. In addition, it becomes hard to physically copy the pit width which changes in accordance with the control data In addition to what is described above, by assigning each bit of the control data SC1 to 1 frame, the control data SC1 can be played back with a high degree of reliability even if the playback signal varies due to noise or the like.

That is to say, the disc raw plate 42 completing the exposure process is subjected to development and electro-casting process to fabricate a mother disc from which a stamper is produced. Then, the lower-layer disc plate 26A of the optical disc 26 shown in FIGS. 13 and 14 is made by an injection molding process using the stamper.

The upper-layer disc plate 26B of the optical disc 26 is produced from a stamper which is created by recording a digital audio signal completing multi-bit quantization at a sampling frequency of 44.1 kHz and is generated from the same source as the digital audio signal D1 by adopting the technique to make the conventional compact disc. Then, the disc plates 26A and 26B are stuck to each other to result in forming the optical disc 26.

A playback signal is reproduced by the playback apparatus 27 from the optical disc 26 of FIG. 16 made in this way by radiating a laser beam to the disc 26. The signal level of the playback signal RF varies in dependence on the quantity of a light reflected by the optical disc 26. That is to say, the detected playback signal RF has a signal level varying in accordance with the pit width. The detected playback signal RF is supplied to the binary-conversion unit 83 for converting the playback signal into a binary-data signal BD. Then, the binary-data signal BD is demodulated by the demodulation unit 85 before being subjected to deinterleaving and error-correction processing in the ECC decoder 86. As a result, the scrambled digital audio signal D1 is reproduced. As for the lead-in area, TOC data is reproduced by the same processing of the playback signal RF.

On the optical disc 26, a pit having a length corresponding to a period of at least 7T or greater is reduced the width locally at a position separated away from both the front and rear edges of the pit by a distance corresponding to a period of at least 3T. Thus, a beam spot of the laser beam scans the edges and the position of a reduced width of a pit with different timings. As a result, the effect of the locally reduced pit width on the playback signal RF can be avoided. That is to say, variations in signal level caused by reduction of the pit width in the proximity of the edges of the pit on the optical disc 26 can be avoided. Thus, even in the case of the optical disc 26 with control data SC1 recorded in the lead-in area thereof, the playback signal RF can be converted into binary data with correct timing and TOC data can thus be played back correctly as is the case with a playback operation to reproduce a signal from the program area of the optical disc 26.

In a playback operation to reproduce the digital audio signal D1 and the TOC data, the control data SC1 recorded in the lead-in area of the optical disc 26 in advance is also reproduced as well. The scrambler-identification data SID included in the reproduced control data SC1 is used to select one of results obtained from the descramble processing carried out by the descramblers 29A to 29X. In addition, the disc-key data DK of the control data SC1 and the initial values of the descramblers 29A to 29X identified by the initial pointers PIV are set in the descramblers 29A to 29X for each sector and for each cluster respectively. Thus, by carrying out descramble processing corresponding to scramble processing performed by the optical-disc recording apparatus 40, the playback apparatus 27 is capable of descrambling the digital audio signal D1 to output a descrambled signal.

In a playback operation to reproduce the control data SC1 recorded in the lead-in area of the optical disc 26, on the other hand, the synchronization-pattern detecting circuit 93 detects a frame sync. The detected frame sync is used by the M-series generating circuit 95 as a reference for generating the random-number data MZ corresponding to the random-number data of the M-series recorded in a recording operation.

The analog/digital-conversion circuit 97 converts the analog playback signal RF into a digital playback signal. By using the random-number data MZ of the M-series as a reference, the selector 99 selects either this digital playback signal or the inverted-polarity signal thereof. As a result, the playback data RX indicating the logic level of the control data SC1 in terms of multi-value data can be reproduced.

Since the pit width is reduced by only 10%, the playback data RX has an extremely poor SN ratio if viewed from a sample unit. In order to solve this problem, the playback data RX reproduced from the optical disc 26 is accumulated for each frame by the accumulator 101 and the adder 100 before being divided by the division circuit 103 to produce an average value BX for improving SN ratio. The binary-conversion unit 104 converts the average BX output by the division circuit 103 into binary data as the decoded control data SC1. The ECC circuit 105 carries out error-correction processing on the control data SC1, outputting the control data SC1 to the system control unit 89. In the system control unit 89, predetermin bits are selectively extracted as the scrambler-identification data SID, the initial pointer PIV and the disc key DK from the control data SC1 in which information such as the scrambler-identification data SID is laid out at random.

In the first embodiment described above, the digital audio signal D1 scrambled by using key data is recorded into the program area as run-length limited code by modulation of shapes of pits in the length (longitudinal) direction while the key data is recorded into the lead-in area by modulation of shape of pits each having a length of at least a predetermined value in the width (tranversal) direction. In the modulation of shapes of pits each having a length of at least a predetermined value in the width direction, the width of each of such pits is changed locally with timing having no effect on information on the positions of the edges of the pit detected during a playback operation. The recording of key data by such physical modulation of a pit shape in the width direction makes it difficult for a disc pirate to illegally duplicate constrictions of peanut shapes of pits of FIGS. 19A to 19D formed in the lead-in area on the disc-plate layer 26A peeled off from the optical disc 26 of FIG. 14 sold in the market, even if, for example, the disc pirate is capable of peeling off the disc-plate layer 26A and transferring a profile of the reflective film 78A to a mold in order to create a stamper for a process of manufacturing an illegal optical disc. Since it is difficult to duplicate constructions of the peanut shapes, particularly the curved portion thereof, upon peeling off the layer, it is also hard to demodulate the key data reproduced from the optical disc 26. As a result, the optical disc 26 offers a merit that it is impossible to descramble the digital audio data D1 recorded in the program area.

According to the second embodiment described above, control data SC1 comprising key data and scrambler-identification data for identifying the type of descramble processing is generated and a digital audio signal D1 is scrambled by using the control data SC1 and recorded onto an optical disc. At the same time, the control data SC1 is recorded with a pit width of a pit locally changed with timing having no effect on information on the position of the edge of the pit detected in a playback operation. Thus, the recorded control data SC1 is difficult to decode and to decode, making it hard to make a physical copy of the optical disc. As a result, an illegal copy of the optical disc can be avoided extremely effectively in comparison with the conventional disc.

In addition, an initial value IV is set for each type of scramble processing. By including initial pointers PIVs each used for identifying an initial value IV in the control data SC1, control codes and a digital audio signal can be recorded in such a way that it is difficult to recognize the identity of the type of scramble processing from the result of the scrambling processing even if the same type of scramble processing is selected. As a result, an illegal copy of the optical disc can be avoided effectively.

In addition, by creating the control data SC1 by random relocation, it becomes difficult to decode the control data SC1. As a result, an illegal copy of the optical disc can be avoided effectively.

Moreover, by modulating the pit width by modulation of the control data SC1 using a random number, the control data SC1 can be recorded in such a way that it is difficult to distinguish noise and the control data SC1 from each other and it is possible to make the control data SC1 recorded in terms of pit widths hard to decode. In a playback operation, the control data SC1 can be reproduced by effectively avoiding effects of noise.

In addition, by recording control data in the lead-in area, the control data can also be reproduced in an operation to play back necessary TOC data required in reproduction of a signal from the optical disc 26. As a result, processing to reproduce control data can be made difficult to recognize.

Moreover, information such as disc-identification data is set for each sector. Thus, in processing such as a random playback operation, a digital audio signal can be reproduced from a desired location and descrambled.

On the top of that, a pit having a length of at least a predetermined value or greater is selected and the width of the pit at a location separated away from the edge of the pit by a distance of at least 3T or greater is changed to record the control data SC1. That is to say, the control data SC1 can be recorded by locally changing the pit width with timing having no effect on information on the position of the edge of the pit detected in a playback operation. In particular, with the width of a pit changed at a location separated away from the edge of the pit by a distance of at least 3T or greter, TOC data can be reproduced by using an optical pickup for playing back a digital audio signal D1 recorded in a program area with assurance of the same phase and amplitude margins as the playback operation to reproduce the digital audio signal D1 from the program area, and in addition, the control data SC1 can be recorded. As a result, the control data SC1 can be used for avoiding an illegal copy.

In addition, in the second modulation circuit, a pit with a length corresponding to a period of at least 7T or greater is detected and the logic level of the modulated data D3 is inverted to generate a modulated signal S3 with timing separated from the timing of the edge of the detected pit by a predetermined period in accordance with the control data SC1. The control data SC1 can thus be recorded with ease and with a high degree of reliability without affecting a playback operation to reproduce TOC data based on a series of pits whatsoever.

Furthermore, by setting the variation in pit width at 10% of the average pit width, the control data SC1 can be recorded in such a way that it is difficult to distinguish the control data SC1 from the noise and it is also hard to decode as well as to decode the control data SC1.

Moreover, in the playback apparatus, the level of the playback signal RF is detected, the control data SC1 is decoded and an average value of the signal levels is found to eliminate the effect of introduced noise. As a result, the control data SC1 which has been recorded in such a way that it is difficult to distinguish the control data SC1 from the noise can be reproduced with a high degree of reliability.

On the top of that, by configuring an average value computing means for computing an average value by division of a cumulative value generated by a cumulative adder comprising the accumulator 101 and the adder 100 by a count value output by the pit counter 102, the control data SC1 recorded and assigned to pits with indefinite appearance in 1 frame and each having a length corresponding to a period of at least 7T or greater can be reproduced with a high degree of reliability.

In the embodiment described above, control data is modulated by random-number data of the M-series synchronized with the channel clock signal CK. It should be noted, however, that the scope of the present invention is not limited to this embodiment. For example, by supplying the modulated data D2 to the M-series generating circuit 63 in place of the channel clock signal CK, random-number data of the M-series can also be generated synchronously with the modulated data D3.

In addition, in the embodiment described above, control data is recorded by modulating the width of each pit with a length corresponding to a period of at least 7T or greater. It is worth noting, however, that the scope of the present invention is not limited to this embodiment. In the case of a playback system having sufficient margins with respect to jitters of a playback signal, for example, by modulating the width of each pit with a length corresponding to a period of at least 6T or greater, the same effects can also be obtained.

Furthermore, in the embodiment described above, the width of a pit is reduced at a position separated away from an edge of the pit by a predetermined distance. It should be noted, however, that the scope of the present invention is not limited to this embodiment. In the case of a pit having a length greater than a predetermined value, for example, the width of the pit can be reduced at the center of the pit as shown in FIG. 19A.

Moreover, in the embodiment described above, the pit width is modulated by locally inverting the logic level of the modulated data D3. It is worth noting, .however, that the scope of the present invention is not limited to this embodiment. For example, the pit width can also be modulated by modulating the light quantity of the laser beam. In such a way, the pit width can be modulated by increasing the width locally as shown in FIG. 19B. As an alternative, the control data can be recorded as three values by locally increasing and decreasing the pit width as shown in FIG. 19C. As another alternative, the control data can be recorded as more than three values by setting locally increasing and decreasing the pit width to different degrees. As a further alternative, auxiliary data can be recorded by changing the pit width over a period of time longer than one period of the channel clock signal as shown in FIG. 19D.

On the top of that, in the embodiment described above, 1-bit control data is assigned to 1 frame. It should be noted, however, that the scope of the present invention is not limited to this embodiment. A variety of assignment techniques can be adopted. For example, 1-bit control data can be assigned to a predetermined number of pits each having a length of at least a predetermined value. As an alternative, it is possible to adopt a various technique of sequential and cyclical technique of assignment whereby a plurality of control-data bits are assigned to a pit with a length of at least a predetermined value or greter during a predetermined period of time. It should be noted that, with 1-bit control data assigned to a predetermined number of pits, the pit counter 102 and the division circuit 103 can be eliminated from the playback apparatus.

In addition, in the embodiment described above, the scrambler-identification data is used for selecting one of a plurality of scramblers to determine the type of scramble processing and selecting one of results of descramble processing carried out by a plurality of descramblers. It is worth noting, however, that the scope of the present invention is not limited to this embodiment. For example, a processing circuit can be configured to comprise a scramble unit and a descramble unit and the scramble-identification data is used for switching the processing in the processing circuit from one type to another.

Moreover, in the embodiment described above, the control data comprises an initial pointer used for identifying an initial value and an error-correction code in addition to a disc key used as key data and an identification data used for determining the type of scramble and descramble processing. It should be noted, however, that the scope of the present invention is not limited to this embodiment. For example, the initial pointer used for identifying an initial value and the error-correction code can be eliminated from the control data if the control data excluding them is sufficient for practical purposes.

Furthermore, in the embodiment described above, an auxiliary-data series based on the control data is recorded in the form of variations in pit width. It is worth noting, however, that the scope of the present invention is not limited to this embodiment. For example, by varying the land width by local variation of the widths of adjacent pits in the radial direction of the optical disc, the auxiliary data can also be recorded. In this case, the playback apparatus detects the level of the playback signal typically on the falling edge of the playback signal corresponding to a land in order to reproduce the auxiliary data.

On the top of that, in the embodiment described above, an auxiliary-data series is recorded by modulating the pit width in the lead-in area while the main-data series is recorded in pits and lands. It should be noted, however, that the scope of the present invention is not limited to this embodiment. For example, the auxiliary data series can also be recorded by modulating and varying the pit width in a variety of areas including the program area. The auxiliary-data series can also be recorded by modulating and varying the pit width in an area with no auxiliary data recorded whatsoever, thus making this area difficult to distinguish from the area in which the auxiliary data is recorded and also difficult to decode.

In addition, in the embodiment described above, information such as the playback signal is converted into binary data in order to reproduce the digital audio signal and the control data. It is worth noting, however, that the scope of the present invention is not limited to this embodiment. For example, it is also possible to adopt a variety of other signal recognizing techniques used widely such as the Bitabi? demodulation.

Moreover, in the embodiment described above, a digital audio signal completing multi-bit quantization at a sampling frequency of 44.1 kHz is recorded onto the disc-plate layer 26B shown in FIG. 13 and a digital audio signal completing 1-bit quantization at a sampling frequency of 44.1 kHz×n where n is an integer equal to or greater than 1 is recorded onto the disc-plate layer 26A also shown in FIG. 13. It should be noted, however, that the scope of the present invention is not limited to this embodiment. For example, the present invention can also be applied to a wide range of applications including a case in which a digital audio signal completing multi-bit quantization at a sampling frequency of 48 kHz and a digital audio signal completing multi-bit quantization at a sampling frequency of 48 kHz×n where n is an integer greater than 1 are recorded.

Furthermore, in the embodiment described above, the present invention is applied to an optical disc having two information-recording layers wherein the pit width on one of the information recording layers is modulated. It is worth noting, however, that the scope of the present invention is not limited to this embodiment. For example, the present invention can also be applied to a wide range of applications such as the optical disc wherein the pit width on both the information recording layers is modulated or an optical disc having only one information-recording layer wherein the pit width on the information recording layer.

In addition, keys for descrambling main data recorded in the program area of the disc-plate layer 26A shown in FIG. 11 can be recorded in the-lead-in area of the disc-plate layer 26B by physically modulating pit shapes in the width direction. On the other hand, keys for descrambling main digital data recorded in the program area of the disc-plate layer 26B shown in FIG. 11 can be recorded in the lead-in area of the disc-plate layer 26A by physically modulating pit shapes in the width direction. As a result, it will be difficult to extract the key data for descrambling the main data. As described above, by recording key data for descrambling main digital data recorded in the program area of a first layer of an optical disc to the lead-in area of a second layer by physically modulating pit shapes in the width direction and recording key data for descrambling main digital data recorded in the program area of the second layer in the lead-in area of the first layer by physically modulating pit shapes in the width direction, the key data will be difficult to extract.

On the-top of that, in the embodiment described above, desired data is recorded on pits and lands. It should be noted, however, that the scope of the present invention is not limited to this embodiment. For example, the present invention can also be applied to a wide range of applications such as a disc wherein desired data is recorded as marks and spaces.

In addition, in the embodiment described above, the present invention is applied to a case of recording a digital audio signal. It is worth noting, however, that the scope of the present invention is not limited to this embodiment. For example, the present invention can also be applied to a wide range of applications such as a variety of optical discs including a video disc and their peripheral devices.

As described above, according to the present invention, an auxiliary-data series is formed to comprise key data required for descrambling a main-data series and data for determining the type of processing to descramble the main-data series and is recorded onto a disc by locally changing the widths of pits or the like with timing having no effect on information on positions of edges of the pits or the like detected during a playback operation. As a result, illegal copies can be avoided effectively.

What is claimed is:

1. A recording apparatus for recording digital main data as alternating marks and spaces on a disc by modulation of one of said marks and spaces in a run-length direction thereof in accordance with said data, said recording apparatus comprising:

key-data generating means for generating key data;

encryption means for encrypting said digital main data on the basis of said key data generated by said key-data generating means;

key-data modulation means for modulating one of said marks and spaces in a width direction thereof in accordance with said key data generated by said key-data generating means; and recording means for recording said key data used in said modulating of one of said marks and spaces carried out by said key-data modulation means in a width direction thereof and for recording said digital main data encrypted by said encryption means, wherein said encryption means comprises a run-length detector for measuring a run length of one of said marks and spaces over a predetermined distance;

random-data generating means for generating random data; and control means for varying the width of one of said marks and spaces in accordance with said random data generated by said random-data generating means and in dependence on a measurement output by said run-length detector.

2. The recording apparatus according to claim 1, wherein said encryption means comprises a first encryption means and further comprising:

a plurality of second encryption means in addition to said first encryption means and each having encryption procedures different from each other;

encryption-means-identification-data generating means for generating-encryption-means-identification data for specifying a required one of said plurality of second encryption means;

select means for selecting the required one of said plurality of second encryption means in accordance with said encryption-means-identification data generated by said encryption-means-identification-data generating means; and encryption-means-identification-data modulation means for modulating one of said marks and spaces in a width direction thereof in accordance with said encryption-means-identification data generated by said encryption-means-identification-data generating means, wherein said recording means records said encryption-means-identification data used in modulating said one of said marks and spaces carried out by said encryption-means-identification-data modulation means in a width direction thereof.

3. The recording apparatus according to claim 1, wherein said key data is recorded by modulating one of said marks and spaces in a lead-in area of said disc by using said key data modulation means.

4. A disc-shaped recording medium for storing digital information encrypted using predetermined key data on recording tracks by modulation of a series of alternating marks and spaces on each of said recording tracks, said disc-shape recording medium comprising:

a program area having a plurality of said recording tracks wherein said encrypted digital information is recorded by modulating one of said marks and spaces in a length direction thereof; and a lead-in area wherein said key data is recorded by modulating said one of said marks and spaces in a width direction thereof, wherein said lead-in area is also used for recording said encryption-means-identification data used for selecting one of a plurality of encryption methods by modulating one of said marks and spaces in a width direction thereof, and wherein control data forms said key data and said encryption-means-identification data recorded in said lead-in area by modulating said one of said marks and spaces in a width direction thereof performs random-number processing.

5. The disc-shaped recording medium according to claim 4 wherein said recording medium includes first and second layers and further wherein:

key data recorded in said lead-in area on said first layer is used for decrypting digital information recorded in said program area on second layer; and key data recorded in said lead-in area on said second layer is used for decrypting digital information recorded in said program area on said first layer.

6. The disc-shaped recording medium according to claim 5 wherein:

said program area of said first layer records a digital audio signal quantized at a sampling frequency fs (Hz); and said program area on said second layer records a digital audio signal content at a sampling frequency fs×n, where n is an integer equal to or greater than 2.

* * * * *